US010892883B2

United States Patent
Luo et al.

(10) Patent No.: US 10,892,883 B2
(45) Date of Patent: Jan. 12, 2021

(54) RESOURCE COORDINATION FOR HALF DUPLEX COMMUNICATIONS

(71) Applicant: QUALCOMM Incorporated, San Diego, CA (US)

(72) Inventors: Jianghong Luo, Skillman, NJ (US); Navid Abedini, Somerset, NJ (US); Bilal Sadiq, Basking Ridge, NJ (US); Muhammad Nazmul Islam, Littleton, MA (US); Junyi Li, Chester, NJ (US); Karl Georg Hampel, Hoboken, NJ (US); Hong Cheng, Bridgewater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 2 days.

(21) Appl. No.: 16/268,791

(22) Filed: Feb. 6, 2019

(65) Prior Publication Data

US 2019/0305923 A1 Oct. 3, 2019

Related U.S. Application Data

(60) Provisional application No. 62/648,640, filed on Mar. 27, 2018.

(51) Int. Cl.
*H04L 5/16* (2006.01)
*H04L 5/14* (2006.01)
(Continued)

(52) U.S. Cl.
CPC .............. *H04L 5/16* (2013.01); *H04L 5/1476* (2013.01); *H04W 72/12* (2013.01);
(Continued)

(58) Field of Classification Search
CPC ............... H04W 24/04; H04W 72/046; H04W 72/0453; H04W 40/246; H04W 72/044;
(Continued)

(56) References Cited

U.S. PATENT DOCUMENTS 8,509,162 B2 * 8/2013 Horn ................. H04W 72/1263
370/315
8,553,711 B2 * 10/2013 Borran .................. H04W 16/02
370/431
(Continued)

FOREIGN PATENT DOCUMENTS

EP 0806847 A2 11/1997
EP 2476284 B1 1/2014
(Continued)

OTHER PUBLICATIONS

International Search Report and Written Opinion—PCT/US2019/017063—ISA/EPO—dated Apr. 11, 2019.
(Continued)

*Primary Examiner* — Hanh N Nguyen
(74) *Attorney, Agent, or Firm* — Linda G. Gunderson; Holland & Hart LLP

(57) ABSTRACT

Methods, systems, and devices for wireless communications are described that provide for resource allocation in an integrated access and backhaul (IAB) network. A relay node in an IAB network may be assigned a first resource partition that is different from a second resource partition for the child and parent nodes. Based on a resource configuration (e.g., for a slot) of the second resource partition, the relay node may opportunistically utilize the second resource partition for communications. For instance, the relay node may determine a direction table based on the resource configurations of the child and parent nodes, which may be used to perform uplink or downlink communications in one or more symbols of the second resource partition. The relay node may also identify flexible symbols as free or non-free when determining the direction table.

66 Claims, 15 Drawing Sheets

(51) Int. Cl.
*H04W 72/12* (2009.01)
*H04W 88/04* (2009.01)

(52) U.S. Cl.
CPC ... *H04W 72/1205* (2013.01); *H04W 72/1278* (2013.01); *H04W 88/04* (2013.01)

(58) Field of Classification Search
CPC .......... H04W 72/042; H04W 72/1278; H04W 72/1205; H04W 24/10; H04W 72/0446; H04W 72/1289; H04W 72/1284; H04W 88/04; H04W 84/047; H04W 52/14
See application file for complete search history.

(56) References Cited

U.S. PATENT DOCUMENTS

| | | | |
|---|---|---|---|
| 9,137,821 B2* | 9/2015 | Farajidana | H04W 72/14 |
| 9,768,942 B2* | 9/2017 | Golitschek Edler von Elbwart | H04W 72/0446 |
| 9,973,257 B1* | 5/2018 | Sung | H04B 7/15528 |
| 10,039,107 B2* | 7/2018 | Faerber | H04W 72/046 |
| 2017/0126306 A1 | 5/2017 | Kim et al. | |
| 2019/0268923 A1* | 8/2019 | Sundararajan | H04W 72/1289 |
| 2020/0145997 A1* | 5/2020 | Luo | H04W 72/1284 |
| 2020/0170010 A1* | 5/2020 | Luo | H04L 5/26 |

FOREIGN PATENT DOCUMENTS

| | | |
|---|---|---|
| WO | WO-2011036839 A1 | 3/2011 |
| WO | WO-2011091746 A1 | 8/2011 |

OTHER PUBLICATIONS

ZTE: "Consideration on UL Backhaul Resource Configuration and Indication", R1-092469, 3rd Generation Partnership Project (3GPP), Mobile Competence Centre; 650, Route Des Lucioles; F-06921 Sophia-Antipolis Cedex ; France, No. Los Angeles, USA; 20090623, Jun. 23, 2009, XP050350978, [retrieved on Jun. 23, 2009], 6 pages.

* cited by examiner

RESOURCE COORDINATION FOR HALF DUPLEX COMMUNICATIONS

CROSS REFERENCES

The present Application for Patent claims the benefit of U.S. Provisional Patent Application No. 62/648,640 by LUO et al., entitled "RESOURCE COORDINATION FOR HALF DUPLEX COMMUNICATIONS," filed Mar. 27, 2018, assigned to the assignee hereof, and is expressly incorporated herein by reference.

BACKGROUND

The following relates generally to wireless communications, and more specifically to resource coordination for half duplex communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems, such as those operating in a millimeter wave (mmW) spectrum, may include access nodes (ANs) to facilitate wireless communication between a UE and the network. In some cases, an anchor AN may have a high-capacity, wired, backhaul connection (e.g., fiber) to the network, while communicating simultaneously with one or more ANs (e.g., relay devices) or UEs. A network that supports communications between an AN and a UE may be referred to as an access network, while a network that supports communications between one or more ANs may be referred to as a backhaul network. In deployments supporting both access and backhaul (e.g., in an Integrated Access and Backhaul (IAB) network), resource allocation may be complex due to the considerations taken into account when scheduling including those related to half-duplex constraints (e.g., where an AN may not be able to transmit and receive communications at the same time).

SUMMARY

The described techniques relate to improved methods, systems, devices, or apparatuses that support resource coordination for half duplex communications. Generally, the described techniques provide for resource coordination for half duplex communications in an Integrated Access and Backhaul (IAB) network. In some cases, resources may be assigned to node sets, such that a node may schedule transmissions only during the resources assigned to the node set associated with the node. A relay node may receive resource configurations from its parent and child nodes to determine a direction table. The relay node may schedule transmissions with the parent and child nodes based on the direction table. For example, the direction table may indicate transmissions that the relay node may be allowed to perform during the resources that are not assigned to the node set of the relay node (i.e., the resources assigned to the parent and child nodes of the relay node). In some cases, the parent and/or child nodes may be configured for flexible transmission, which may allow the relay node to schedule transmissions during the resources that are not assigned to the node set of the relay node.

A method of wireless communications is described. The method may include identifying, at a relay device (e.g., a base station, a user equipment (UE), an access node (AN)), a set of resources partitioned into a first subset of resources for the relay device and a second subset of resources for a parent network node (e.g., a base station, a UE, an AN) and a child network node (e.g., a base station, a UE, an AN) in communication with the relay device, receiving, from the parent network node, a first resource configuration for a slot of the second subset of resources, receiving, from the child network node, a second resource configuration for the slot of the second subset of resources, scheduling communications in the slot of the second subset of resources based on the first and second resource configurations, and communicating with one or more devices during the slot of the second subset of resources according to the scheduled communications.

An apparatus for wireless communications is described. The apparatus may include means for identifying, at a relay device, a set of resources partitioned into a first subset of resources for the relay device and a second subset of resources for a parent network node and a child network node in communication with the relay device, means for receiving, from the parent network node, a first resource configuration for a slot of the second subset of resources, means for receiving, from the child network node, a second resource configuration for the slot of the second subset of resources, means for scheduling communications in the slot of the second subset of resources based on the first and second resource configurations, and means for communicating with one or more devices during the slot of the second subset of resources according to the scheduled communications.

Another apparatus for wireless communications is described. The apparatus may include a processor, memory in electronic communication with the processor, and instructions stored in the memory. The instructions may be operable to cause the processor to identify, at a relay device, a set of resources partitioned into a first subset of resources for the relay device and a second subset of resources for a parent network node and a child network node in communication with the relay device, receive, from the parent network node, a first resource configuration for a slot of the second subset of resources, receive, from the child network node, a second resource configuration for the slot of the second subset of resources, schedule communications in the slot of the second subset of resources based on the first and second resource configurations, and communicate with one or more devices during the slot of the second subset of resources according to the scheduled communications.

A non-transitory computer-readable medium for wireless communications is described. The non-transitory computer-readable medium may include instructions operable to cause a processor to identify, at a relay device, a set of resources partitioned into a first subset of resources for the relay device and a second subset of resources for a parent network node and a child network node in communication with the relay device, receive, from the parent network node, a first resource configuration for a slot of the second subset of resources, receive, from the child network node, a second resource configuration for the slot of the second subset of resources, schedule communications in the slot of the second subset of resources based on the first and second resource configurations, and communicate with one or more devices during the slot of the second subset of resources according to the scheduled communications.

Some examples of the method, apparatus, and non-transitory computer-readable medium described herein may further include processes, features, means, or instructions for identifying a slot structure for a slot of the first subset of resources, where the slot structure indicates a set of flexible symbols. Some examples of the method, apparatus, and non-transitory computer-readable medium described herein may further include processes, features, means, or instructions for dividing the set of flexible symbols into a set of free flexible symbols and a set of non-free flexible symbols. Some examples of the method, apparatus, and non-transitory computer-readable medium described herein may further include processes, features, means, or instructions for transmitting an indication of the set of free flexible symbols to the parent network node or the child network node.

Some examples of the method, apparatus, and non-transitory computer-readable medium described herein may further include processes, features, means, or instructions for receiving, from the parent network node or the child network node, a request for a number of free flexible symbols, where the indication of the set of free flexible symbols may be transmitted in response to the request.

In some examples of the method, apparatus, and non-transitory computer-readable medium described herein, transmitting the indication of the set of free flexible symbols includes transmitting a radio resource control (RRC) message that specifies a ratio of a number of free flexible symbols to a total number of flexible symbols of the set of flexible symbols.

Some examples of the method, apparatus, and non-transitory computer-readable medium described herein may further include processes, features, means, or instructions for determining the set of free flexible symbols based on a traffic demand of a cell supported by the relay device.

In some examples of the method, apparatus, and non-transitory computer-readable medium described herein, the indication includes a bitmap that specifies whether a flexible symbol of the set of flexible symbols may be free.

Some examples of the method, apparatus, and non-transitory computer-readable medium described herein may further include processes, features, means, or instructions for transmitting, to the child network node, a request for a number of free flexible symbols of the slot of the second subset of resources. Some examples of the method, apparatus, and non-transitory computer-readable medium described herein may further include processes, features, means, or instructions for receiving, from the child network node, an indication of the number of free flexible symbols in response to the request.

In some examples of the method, apparatus, and non-transitory computer-readable medium described herein, receiving the indication of the number of free flexible symbols includes receiving an RRC message that specifies a ratio of the number of free flexible symbols to a total number of flexible symbols of the slot.

In some examples of the method, apparatus, and non-transitory computer-readable medium described herein, the indication includes a bitmap that specifies whether a flexible symbol of the slot of the second subset of resources may be free.

Some examples of the method, apparatus, and non-transitory computer-readable medium described herein may further include processes, features, means, or instructions for transmitting, to the parent network node, a request for a number of free flexible symbols of the slot of the second subset of resources. Some examples of the method, apparatus, and non-transitory computer-readable medium described herein may further include processes, features, means, or instructions for receiving, from the parent network node, an indication of the number of free flexible symbols in response to the request.

In some examples of the method, apparatus, and non-transitory computer-readable medium described herein, receiving the indication of the number of free flexible symbols includes receiving an RRC message that specifies a ratio of the number of free flexible symbols to a total number of flexible symbols of the slot.

In some examples of the method, apparatus, and non-transitory computer-readable medium described herein, the indication includes a bitmap that specifies whether a flexible symbol of the slot of the second subset of resources may be free.

Some examples of the method, apparatus, and non-transitory computer-readable medium described herein may further include processes, features, means, or instructions for determining a direction table for the slot of the second subset of resources based on the first and second resource configurations, where the direction table indicates a communication direction for a set of symbols of the slot of the second subset of resources.

Some examples of the method, apparatus, and non-transitory computer-readable medium described herein may further include processes, features, means, or instructions for determining, for a symbol of the slot of the second subset of resources, that the parent network node and the child network node may be scheduled for downlink transmissions. Some examples of the method, apparatus, and non-transitory computer-readable medium described herein may further include processes, features, means, or instructions for indicating the symbol of the slot of the second subset of resources as uplink based on determining that the parent network node and child network nodes may be scheduled for downlink transmissions.

Some examples of the method, apparatus, and non-transitory computer-readable medium described herein may further include processes, features, means, or instructions for determining, for a symbol of the slot of the second subset of resources, that the parent network node and the child network node may be scheduled for uplink transmissions. Some examples of the method, apparatus, and non-transitory computer-readable medium described herein may further include processes, features, means, or instructions for indicating the symbol of the slot of the second subset of resources as downlink based on determining that the parent and child network nodes may be scheduled for uplink transmissions.

Some examples of the method, apparatus, and non-transitory computer-readable medium described herein may further include processes, features, means, or instructions for determining, for a symbol of the slot of the second subset of resources, that the parent network node and the child network node may be scheduled for different communication directions. Some examples of the method, apparatus, and non-transitory computer-readable medium described herein may further include processes, features, means, or instructions for indicating the symbol of the slot of the second subset of resources as unavailable based on determining that the parent and child network nodes may be scheduled for different communication directions.

Some examples of the method, apparatus, and non-transitory computer-readable medium described herein may further include processes, features, means, or instructions for identifying, for the slot of the second subset of resources, a first set of free flexible symbols for the parent network node or the child network node. Some examples of the method, apparatus, and non-transitory computer-readable medium described herein may further include processes, features, means, or instructions for determining, for a symbol of the slot of the second subset of resources, that the parent network node and the child network node may be either free flexible or scheduled for downlink transmissions. Some examples of the method, apparatus, and non-transitory computer-readable medium described herein may further include processes, features, means, or instructions for indicating the symbol of the slot of the second subset of resources as uplink based on determining that the parent network node and the child network node may be either free flexible or scheduled for downlink transmissions.

Some examples of the method, apparatus, and non-transitory computer-readable medium described herein may further include processes, features, means, or instructions for identifying, for the slot of the second subset of resources, a first set of free flexible symbols for the parent network node or the child network node. Some examples of the method, apparatus, and non-transitory computer-readable medium described herein may further include processes, features, means, or instructions for determining, for a symbol of the slot of the second subset of resources, that the parent network node and the child network node may be either free flexible or scheduled for uplink transmissions. Some examples of the method, apparatus, and non-transitory computer-readable medium described herein may further include processes, features, means, or instructions for indicating the symbol of the slot of the second subset of resources as downlink based on determining that the parent network node and the child network node may be either free flexible or scheduled for uplink transmissions.

Some examples of the method, apparatus, and non-transitory computer-readable medium described herein may further include processes, features, means, or instructions for receiving a resource allocation scheme from the parent network node or an anchor network node, where the resource allocation scheme indicates the first and second subsets of resources.

Some examples of the method, apparatus, and non-transitory computer-readable medium described herein may further include processes, features, means, or instructions for transmitting, to the child network node, a request for the second resource configuration. Some examples of the method, apparatus, and non-transitory computer-readable medium described herein may further include processes, features, means, or instructions for receiving, from the child network node, the second resource configuration in response to the request.

In some examples of the method, apparatus, and non-transitory computer-readable medium described herein, the second resource configuration may be received via a physical uplink control channel (PUCCH) or a physical uplink shared channel (PUSCH).

Some examples of the method, apparatus, and non-transitory computer-readable medium described herein may further include processes, features, means, or instructions for identifying transmission regulation information associated with the second subset of resources. Some examples of the method, apparatus, and non-transitory computer-readable medium described herein may further include processes, features, means, or instructions for communicating with one or more devices during the slot of the second subset of resources based on the transmission regulation information.

In some examples of the method, apparatus, and non-transitory computer-readable medium described herein, identifying transmission regulation information includes receiving, from at least one of the parent network node and the child network node, transmission regulation information associated with the parent network node or the child network node.

In some examples of the method, apparatus, and non-transitory computer-readable medium described herein, the transmission regulation information includes a range of beam directions, a set of beam widths, or a transmission power.

Some examples of the method, apparatus, and non-transitory computer-readable medium described herein may further include processes, features, means, or instructions for allocating a control channel for the relay device to resources of the first subset of resources.

In some examples of the method, apparatus, and non-transitory computer-readable medium described herein, the control channel may be associated with communications via the first or second subsets of resources.

Some examples of the method, apparatus, and non-transitory computer-readable medium described herein may further include processes, features, means, or instructions for allocating a second control channel for the relay device to resources of the second subset of resources.

Some examples of the method, apparatus, and non-transitory computer-readable medium described herein may further include processes, features, means, or instructions for determining a direction table for the resources of the second subset of resources based on control channel configurations for the parent network node and the child network node.

Some examples of the method, apparatus, and non-transitory computer-readable medium described herein may further include processes, features, means, or instructions for receiving an indication of a control channel allocation for a control channel for the relay device, where the control channel may be associated with communications via the first or second subsets of resources.

Some examples of the method, apparatus, and non-transitory computer-readable medium described herein may further include processes, features, means, or instructions for scheduling communications for a slot of the first subset of resources independent of the first and second resource configurations. Some examples of the method, apparatus, and non-transitory computer-readable medium described herein may further include processes, features, means, or instructions for communicating with one or more devices during the slot of the first subset of resources according to the scheduled communications.

Some examples of the method, apparatus, and non-transitory computer-readable medium described herein may further include processes, features, means, or instructions for receiving the first resource configuration via a semi-static cell-specific message, a semi-static UE-specific message, or a group-common control channel.

In some examples of the method, apparatus, and non-transitory computer-readable medium described herein, the semi-static cell-specific message may be received via a system information block (SIB). In some examples of the method, apparatus, and non-transitory computer-readable medium described herein, the semi-static UE-specific message may be received via RRC signaling. In some examples of the method, apparatus, and non-transitory computer-readable medium described herein, the group-common control channel may be received via a group-common physical downlink control channel (GC-PDCCH) and includes a slot format indicator (SFI).

DETAILED DESCRIPTION

Figure 1:
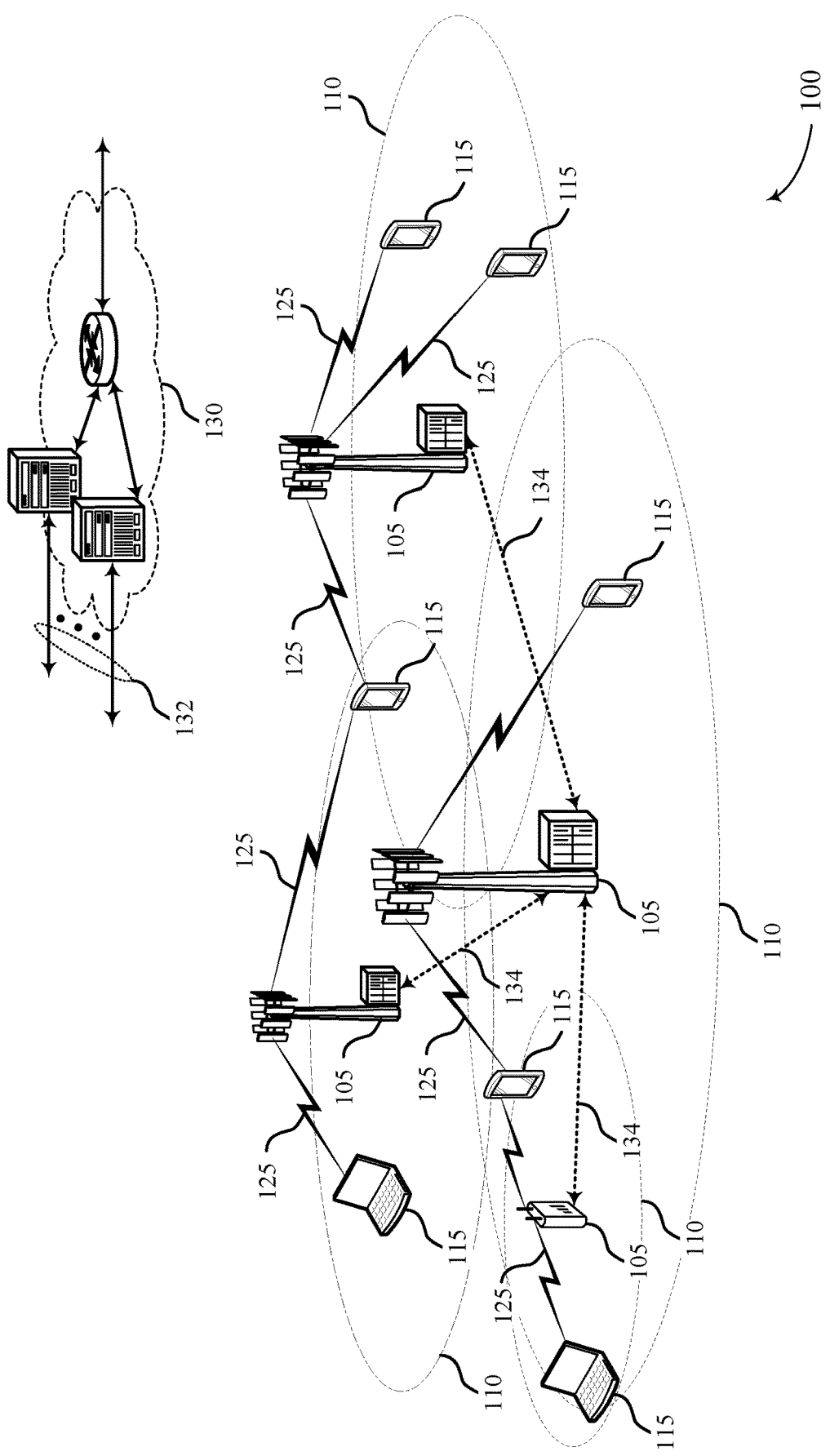
FIGS. 1 and 2 illustrate examples of wireless communications systems that support resource coordination for half duplex communications in accordance with aspects of the present disclosure.

In some wireless communications systems, such as those deploying New Radio (NR) technologies, wireless backhaul links may be used to couple an access node (AN) to a network in place of high-capacity, wired backhaul link (e.g., fiber). For example, a first AN (e.g., relay node) in communication with a user equipment (UE), or another AN, may establish a backhaul link (wired or wireless) with a second AN (e.g., an anchor), which has a high-capacity, wired backhaul link to the network. In this manner, the first AN may communicate access traffic from the UE (or another AN) to the network via the second AN through the combination of the one or more backhaul links. In some examples, a backhaul network may use multiple backhaul links before reaching a wired backhaul link. The first AN may be referred to as a UE-Function (UEF) with respect to the anchor and an Access Node Function (ANF) with respect to the UE (or another AN) with which the first AN is communicating. Thus, a relay node may act as a UE for its one or more parent relays (e.g., relays that connect the relay node one hop closer to the anchor) and as a base station for its child relays and/or UEs within its coverage area.

In some cases, the backhaul network may provide robustness via topological redundancy by providing alternate paths for traffic to travel (e.g., in case of broken communication links), for example. In such an ad-hoc network, large-scale resource coordination schemes may serve to optimize communications between UEs and the network. In some aspects, resources available for communication may be dynamically allocated to the backhaul and access links. The resources may refer to any combination of time, frequency, code, or space. In some cases, wireless communications systems may deploy one or more techniques to support coordination of signaling and resource allocation for wireless backhaul networks in order to support integrated access and backhaul (IAB).

In some cases, the ANs may be divided into multiple node sets. In a case of two node sets (e.g., a first node set and a second node set), each AN may be in a node set that is different from its parent and child nodes. Available time-frequency resources may be divided into two groups such that each group of time-frequency resources is assigned to a node set. The ANs may freely schedule transmissions via the time-frequency resources that are assigned to their node set, and may schedule transmissions in a constrained manner during the time-frequency resources that are not assigned to their node set.

The resources available to the ANs may be configured for uplink communications, downlink communications, or may be flexible. When a resource is configured as flexible, it may be configured for uplink or downlink at a later time. In the time-frequency resources assigned to a first node set, the ANs of the first node set may freely configure the resources for uplink, downlink, or as flexible. In the time-frequency resources assigned to a second node set, the ANs of the second node set may freely configure the resources for uplink, downlink, or as flexible. In some cases, flexible resources may be designated as free flexible or non-free flexible. Free flexible resources may be utilized for scheduling by nodes of the first node set during resource assigned to the second node set and may be utilized for scheduling by nodes of the second node set during resources assigned to the first node set. Non-free flexible resources may not be utilized by nodes that do not belong to the node set.

ANs may determine direction tables via resources that are not assigned to their node set. A direction table may indicate a communication direction for resources that are not assigned to the node set of an AN, and the direction table may be determined based on the resource configurations of a relay node's parent and child nodes.

Aspects of the disclosure are initially described in the context of wireless communications systems. Aspects of the disclosure are also illustrated and described with reference to a network scheme and process flows. Aspects of the disclosure are further illustrated by and described with reference to apparatus diagrams, system diagrams, and flowcharts that relate to resource coordination for half duplex communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. It should be noted that half-duplex communications do not limit transmission or reception on multiple links simultaneously. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an AN controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carrier (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread OFDM (DFT-S-OFDM).

Wireless communications system 100 may provide a flexible slot structure to support dynamic TDD, which may involve a plurality of TDD configurations that may be utilized to adaptively assign uplink and downlink resources based on the traffic needs of the wireless communications system 100. Such a slot structure may assign the symbols of a slot as downlink, uplink, or flexible. Symbols designated for downlink may be utilized for downlink transmissions, symbols designated for uplink may be utilized for uplink transmissions, and symbols designated as flexible symbols may be overridden as downlink or uplink symbols based on received configuration signals. In such a configuration, each slot may contain a mixture of downlink, uplink, and flexible symbols.

In some cases, a slot structure may be indicated to a UE 115 semi-statically through a cell-specific message in a SIB (e.g., via tdd-UL-DL-configuration-common). Such an indication may define a communication direction for a set of symbols (e.g., the downlink segment, the uplink segment, and the flexible segment) of one or more slots (e.g., within a certain periodicity such as 0.5, 0.615, 1, 1.25, 2, 2.5, 5, 10 ms). A slot structure may be indicated to a UE 115 semi-statically through UE-specific message in RRC (e.g., via tdd-UL-DL-configuration-dedicated). The UE-specific message may set the slot format per slot for slots within the flexible segment that is configured by a SIB message. In other cases, a slot structure may be indicated to a UE 115 through slot format indicator (SFI), which if enabled, may be carried by group-common physical downlink control channel (GC-PDCCH). The SFI may indicate the slot format per slot over an SFI monitoring periodicity. The SFI monitoring periodicity may be configured as a certain number of slots (e.g., 1, 2, 5,10, 20). In some examples, a flexible part of one configuration may be overridden by another configuration (e.g., based on a set of rules or conditions). For example, the cell-specific configuration may be overridden by a UE-specific configuration, a semi-static configuration may be overridden by dynamic SFI, and both semi-static configuration and dynamic SFI may be overridden by a UE-specific downlink control information (DCI) grant.

Wireless communications system 100 may support a general slot structure framework such that different slot structure patterns may be utilized in different time scales. In such instances, both semi-static and dynamic configurations may be utilized. For example, a slot structure framework may be configured over a given duration (e.g., several milliseconds) through cell-specific configuration or over a number of slots through UE-specific configuration or dynamic SFI. Further, a semi-static configuration may be utilized in cases where the uplink-to-downlink traffic ratio is statistically stable or slow changing. Dynamic configurations, on the other hand, may achieve better resource utilization at the cost of higher signaling overhead for scenarios where the uplink-to-downlink traffic ratio varies over time. This increase in signaling overhead may be dependent on the utilization of beam sweeping.

The organizational structure of the carriers may be different for different radio access technologies (RATs), such as LTE, LTE-A, LTE-A Pro, NR, etc. For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that may support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system and may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may employ one or more wired and wireless backhaul links (e.g., backhaul link 132 or backhaul link 134) for establishing connectivity between a core network 130 and one or more wireless nodes within wireless communications system 100. For example, wireless communications system 100 may include multiple relay devices such as base stations 105, remote radio heads, etc., which may be referred to as ANs 105. At least one AN 105 may be coupled to a wireline backhaul link, such as an optical fiber cable, and may be referred to as an anchor AN 105. Additional ANs 105 may be coupled to the core network 130 or to another AN 105 via a wireless backhaul link, and may use the backhaul links to communicate backhaul traffic. In such cases, the ANs 105 may wirelessly communicate backhaul access traffic to a high-capacity fiber point (e.g., a location where a wireless node is coupled with a wireline link to core network 130). Each of the backhaul links 132 and 134 may carry packets from the one or more established PDN gateways through the S-GW interface and subsequently direct the packets through the core network and to the coupled wireless nodes over the S1 interface.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

Additionally, wireless communications system 100 may employ one or more wireless access links for establishing mobile access to one or more coupled UEs 115. Each of the ANs 105 and the UEs 115 may be configured to support cellular RATs, such as mmW-based RATs, for access traffic between the UEs 115 and the ANs 105. Moreover, each of ANs 105 may share resources of the configured RATs for access traffic with backhaul traffic over the network (e.g., as in the case of an IAB network). IAB networks may be increasingly beneficial with the evolution of cellular technologies due to enhancements in wireless link capacity. Specifically, IAB networks may provide solutions to densification of network cells (e.g., cost reduction of small cell deployments) and increases in data traffic, as a means to increase or maximize spectrum efficiency through joint optimization and integration of access and backhaul resources within the network. IAB networks may be suitable for mmW RATs due to a large bandwidth per channel and the ability to help mitigate short term signal blocking.

An access link using a mmW-based RAT may be designed as an asymmetric single-hop link, which may be used for assigning control and scheduling tasks to an AN 105 while providing instruction to one or more UEs 115 for scheduling communication. In such cases, an AN 105 may coordinate wireless resources among multiple UEs 115, while each UE 115 may be assigned to one AN 105 at a time. In some cases, inter-node links may be symmetric in nature and may form mesh topologies for enhanced robustness, where wireless transport may occur along multiple hops.

Communication according to a particular RAT (e.g., mmW RAT) over an IAB network may enable one or more functionalities at the ANs 105 of the network. For example, each AN 105 may be configured to support an AN Function (ANF) and a UE Function (UEF) which allows each AN 105 to act as a scheduling entity (e.g., via ANF techniques) and a receiving (e.g., scheduled) entity (e.g., via UEF techniques). Each of the functionalities may be operated via each of the one or more backhaul links 132 and 134. ANF functionality may enable the respective ANs 105 to operate as a scheduling entity over one or more access links, and communicate with one or more UEs 115 located within the IAB network. ANF functionality may further enable the respective ANs 105 to operate as a scheduling entity over one or more coupled backhaul links, to facilitate communication between the one or more other ANs 105 of the IAB network (e.g., via the mesh topology). UEF functionality may enable the respective ANs 105 to operate as a scheduled entity and communicate with one or more other ANs 105 to receive data. The combination of the UEF and ANF capability at each AN 105 of the IAB network may allow each of the ANs 105 to utilize switching operations over the wireless spectrum associated with the RAT, to transmit access traffic to/from UEs 115 and backhaul traffic to/from core network 130 providing coupled access to the one or more PDNs. Additionally, each of ANs 105 may include a routing table (RT) for examining a received data packet and forwarding the packet along the best path of the IAB network toward the specified IP address of the packet's destination.

In some cases, occupancy/availability signaling may be used to enable dynamic resource allocation of the resources defined in the synchronized frame structure between different wireless communication links. For example, if a particular AN 105 is not using some of its dedicated resources, it may signal to neighboring ANs 105 that such resources are available to be used. Upon receiving an indication signal that non-dedicated resources are available to be used, the neighboring AN 105 may schedule data to be transmitted using those available resources.

Scheduling entities, including one or more ANs 105 implementing ANF, may transmit one or more beamforming reference signal (BRSs) to a receptive entity (e.g., a UE 115 or an alternative AN 105 implementing UEF) as part of a beamformed transmission. The ANF configured ANs 105 may transmit the beamformed transmission utilizing a beam-sweeping configuration in one or more spatial directions. The scheduling entities may periodically perform the beamformed transmission (e.g., as configured via RRC signaling), semi-persistently (e.g., as configured via RRC signaling and activated/deactivated via MAC control element (MAC-CE) signaling), or aperiodically (e.g., via DCI). The respective signaling of the one or more BRSs may be directionally oriented with regard to a communication direction of the network including uplink, downlink, and sidelink (e.g., D2D) signaling.

In some cases, in order to guarantee a minimum level of performance for access links (e.g., between an AN 105 and a UE 115), resource allocation between access links and backhaul links may be separated. For instance, a centralized scheduler (e.g., at anchor level or base station level) may allocate separate sets of resources to the access and backhaul links.

Figure 2:
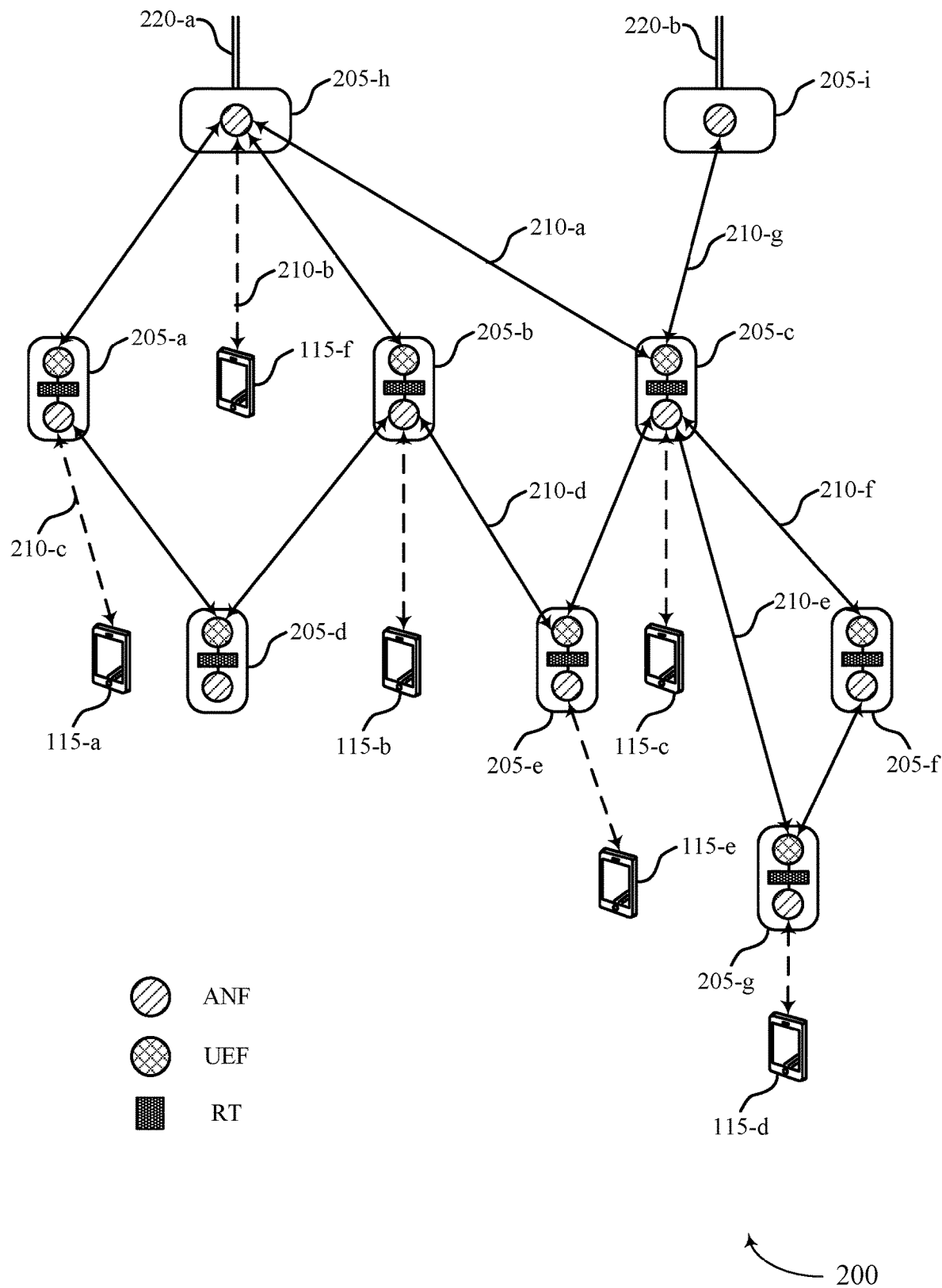

FIG. 2 illustrates an example of a wireless communications system 200 that supports resource coordination for half duplex communications in accordance with various aspects of the present disclosure. In some examples, wireless communications system 200 may implement aspects of wireless communications system 100. In some cases, the wireless communications system 200 may operate in a mmW spectrum, or supports 5G NR deployments. The wireless communications system 200 may include a number of ANs 205 (ANs 205-*a*, 205-*b*, 205-*c*, etc.) and UEs 115 that communicate over a combination of wired links 220 (e.g., wired links 220-*a* and 220-*b*) and wireless links 210. In some cases, the wired links 220 may be core network links, and may connect anchor ANs 205-*h* and 205-*i* to the core network (e.g., core network 130 of FIG. 1). The ANs 205 may be examples of the ANs 105 (e.g., relay devices, base stations 105) described in reference to FIG. 1.

In some examples, complex backhaul topologies may be handled by composing the topology from multiple stars that mutually overlap. For instance, wireless communications system 200 may include a mesh topology with at least two interfaces to a wireline network. Additional ANs 205 may be either directly or indirectly coupled to the respective interfaces of the mesh topology via wireless links 210 (e.g., wireless link 210-*a*). Such a topology may include multiple stars, where some stars mutually overlap. An ANF may be supported by an AN 205 of the mesh topology (ANs 205-*b*, 205-*h*, 205-*i*, etc.). UEF functionality may be configured at some or all of the ANs 205 of the wireless communications system 200. As a result, an AN 205 may include multiple ANFs and UEFs configured for uplink and downlink data packet transmission according to an active mode or a suspended mode using the node functions.

In some cases, each of the one or more wireless links 210 may be associated with wireless resources of a RAT, establishing resource functionality for access and backhaul traffic within the mesh topology. For example, AN 205-*b* may include one or more instances of a UEF, where it may communicate with the ANFs at ANs 205-*h*, 205-*d*, and 205-*e*. In some cases, ANs 205 may each communicate with each other using at least one ANF and at least one UEF, and may form overlapping stars. Wireless links may be associated with different sets of resources, where the resources are cooperatively allocated according to a schedule established by the ANFs. Multiple stars may use techniques to coordinate wireless resources, which may efficiently handle system constraints such as half-duplexed communications, inter-link interference, etc. For instance, inter-link interference may be managed using spatial division multiple access (SDMA) techniques (e.g., through the use of narrow beams), and inter-node beam coordination may account for any remaining interference. In some examples, an AN 205 may also include an RT, which may be used in the determination of a location for packets to be directed. Each AN 205 may further include a relay functionality, where a given AN 205 may relay transmissions between ANs 205, for example, from a UE 115 to another AN 205, such as AN 205-*e* supporting communication between the network and UE 115-*e* via AN 205-*b*.

Additionally or alternatively, mobile access may be integrated at one or more ANs 205 of the wireless communications system 200. Each AN 205 of the integrated mobile access may be configured to form a star topology with UEs 115. For example, AN 205-*a* may correspond to a center of a star topology of integrated mobile access within the network. One or more UEs 115-*a* may be coupled to AN 205-*a* via one or more wireless links (e.g., wireless link 210-*c*). In some examples, mobile access links may also be added to existing stars. In an example, AN 205-*c* may communicate with AN 205-*h* using wireless link 210-*a*. AN 205-*g* may further communicate with UE 115-*d* and AN 205-*c* over wireless links 210 (e.g., wireless link 210-*e*). In this example, wireless links 210-*a* and 210-*e* both share the same set of wireless resources to provide support for IAB. In some cases, a range of ANF and UEF combinations may be instantiated in an AN 205. Additional or different combinations of UEF and ANF instances in ANs 205, as well as different topologies not shown in FIG. 2, may be possible.

The ANF and UEF configurations of the ANs 205 may be assigned the same functionalities and signaling protocols for resource allocation as defined by a RAT. That is, resource coordination of the one or more star topologies contained within the mesh topology may be managed via the RAT, such as a mmW RAT. Further, wireless resource use among ANs 205 within a star may be coordinated via a large-scale (e.g., network-wide) schedule. Within each star, signaling and resource management may be regulated by the RAT and a resource sub-schedule may be generated by a star's ANF. Each wireless link 210 may be coordinated using time synchronization, with a frame structure supported by the RAT. ANs nodes 205 may use a routing function that makes decisions on forwarding of data among node functions residing on the same node. The routing function may be executed or instantiated, for example, on any one of a number of protocol layers (e.g., the routing function may be executed on an IP layer). In some cases, the AN 205 may access an RT, and may forward data between node functions based on the RT. Additionally or alternatively, a routing function or an RT may be used to forward data between different ANs 205.

In some examples, a large-scale or network-wide TDM scheduling (e.g., a super schedule) may be used to assign resources to the various ANs 205 within in a coordinated manner. For example, adjacent stars (e.g., different stars with leaves that share at least one node) or overlapping stars (e.g., stars with one common leaves) may use different wireless resources. At the same time, disjoint stars (e.g., stars that are neither adjacent nor overlapping) may reuse the same wireless resources. The schedule may be followed by all participating ANs 105 through a mutual time synchronization and the frame structure, which may be defined by the RAT.

In some aspects, an ANF may control resource allocation on the one or more links with its child relays, by sub-scheduling the fraction of resources amongst them. In some cases, the sub-scheduling may be based in part on load conditions, network topology, etc. In some cases, the sub-schedule of resources may be indicated to the ANF by the network, via its parent relay, or determined autonomously at the ANF.

In some cases, the UEF may communicate using the link, after receiving the permission of the link's ANF. Further, if an ANF determines that it is not using one of its assigned resources for a certain time period, the ANF may make the resource available to neighboring wireless backhaul links by signaling availability/occupancy indications to neighboring ANs 205. For instance, AN 205-*a* may make wireless resources to be used over wireless link 210-*c*, available to AN 205-*b* (e.g., over wireless link 210-*d*). In some cases, to reduce interference with other signals, frequencies different from those used for the access network may be used to establish wireless backhaul links. For example, mmW signals, such as those used in 5G cellular technologies, may be used to establish wireless backhaul links between ANs.

In some cases, the resource allocation may be determined using one or more schemes. In a first example scheme, resource allocation may be determined by a centralized scheduler (e.g., system wide), which may be referred to as a centralized scheme. In some other cases, a distributed scheme may be implemented, where one or more ANs 205 may exchange signaling, and resource allocation may be determined based on the exchanged signaling. Signaling may include requests from an AN 205 to the scheduler or to other ANs 205. In other cases, signaling may involve one or more ANs 205 exchanging various messages, measurements, or reports such as buffer status reports (BSRs), channel quality, beam quality, and/or interference measurements and reports. Additionally or alternatively, signaling may include a resource configuration from the scheduler or an AN 205 to one or more other ANs 205, or an indication of the resource configuration from an AN 205 to one or more UEs 115 in the same cell, or neighboring cell. In some cases, resource allocation determination may be preconfigured, for example, standardized in a wireless system specification (e.g., 3rd Generation Partnership Project (3GPP) specification).

In some examples, ANs 205 may be grouped into two node sets such that each node belongs to a different node set than its parent and child nodes. For example, ANs 205-*a*, 205-*b*, and 205-*c* may be grouped in a first node set, and ANs 205-*d*, 205-*e*, and 205-*f* may be grouped in a second node set. Resources available to wireless communications system 200 may be partitioned into two groups such that each group of resources may be assigned to a node set. During the resources assigned to the first node set, ANs 205-*a*, 205-*b*, and 205-*c* may freely schedule transmissions and ANs 205-*d*, 205-*e*, and 205-*f* may configure resources in a constrained manner. During the resources assigned to the second node set, ANs 205-*d*, 205-*e*, and 205-*f* may freely schedule transmissions, and ANs 205-*a*, 205-*b*, and 205-*c* may configure resources in a constrained manner.

When an AN 205 configures resources in a constrained manner, the AN 205 may utilize resources that are not configured for uplink or downlink transmissions by the parent and child nodes of the AN 205. For example, during the set of resources assigned to the first node set, AN 205-*d* may identify that its parent nodes (e.g., AN 205-*a* and AN 205-*b*) are not configured for either uplink or downlink transmissions during a first resource. AN 205-*d* may determine that the first resource is free for scheduling transmissions, and AN 205-*d* may then determine to schedule transmissions on the first resource, even though the resource is not assigned to the node set of AN 205-*d* (e.g., the second node set).

In some cases, determining to schedule transmissions during resources not assigned to the node set of an AN 205 may be based at least in part on the AN 205 determining a direction table. The direction table may indicate the communication directions the AN 205 must adhere to during resources. The direction table may be determined during the resources that are not assigned to the node set of the AN 205 based on the resource configurations of the parent and child nodes of the AN 205. For example, during the resources that are assigned to the first node set, AN 205-*d* may receive the resource configurations of its parent nodes (e.g., AN 205-*a* and 205-*b*). AN 205-*d* may identify that both AN 205-*a* and AN 205-*b* are configured for downlink transmissions during a first resource. AN 205-*d* may then configure its direction table for uplink transmissions during the first resource. In other examples, AN 205-*d* may determine that AN 205-*a* and AN 205-*b* are configure as flexible during a first resource, which means that AN 205-*a* and AN 205-*b* may be configured for either uplink or downlink transmissions through further signaling. AN 205-*d* may then configure its direction table as flexible during the first resource, which may indicate that AN 205-*d* may schedule its own transmissions during the first resource.

Figure 3:
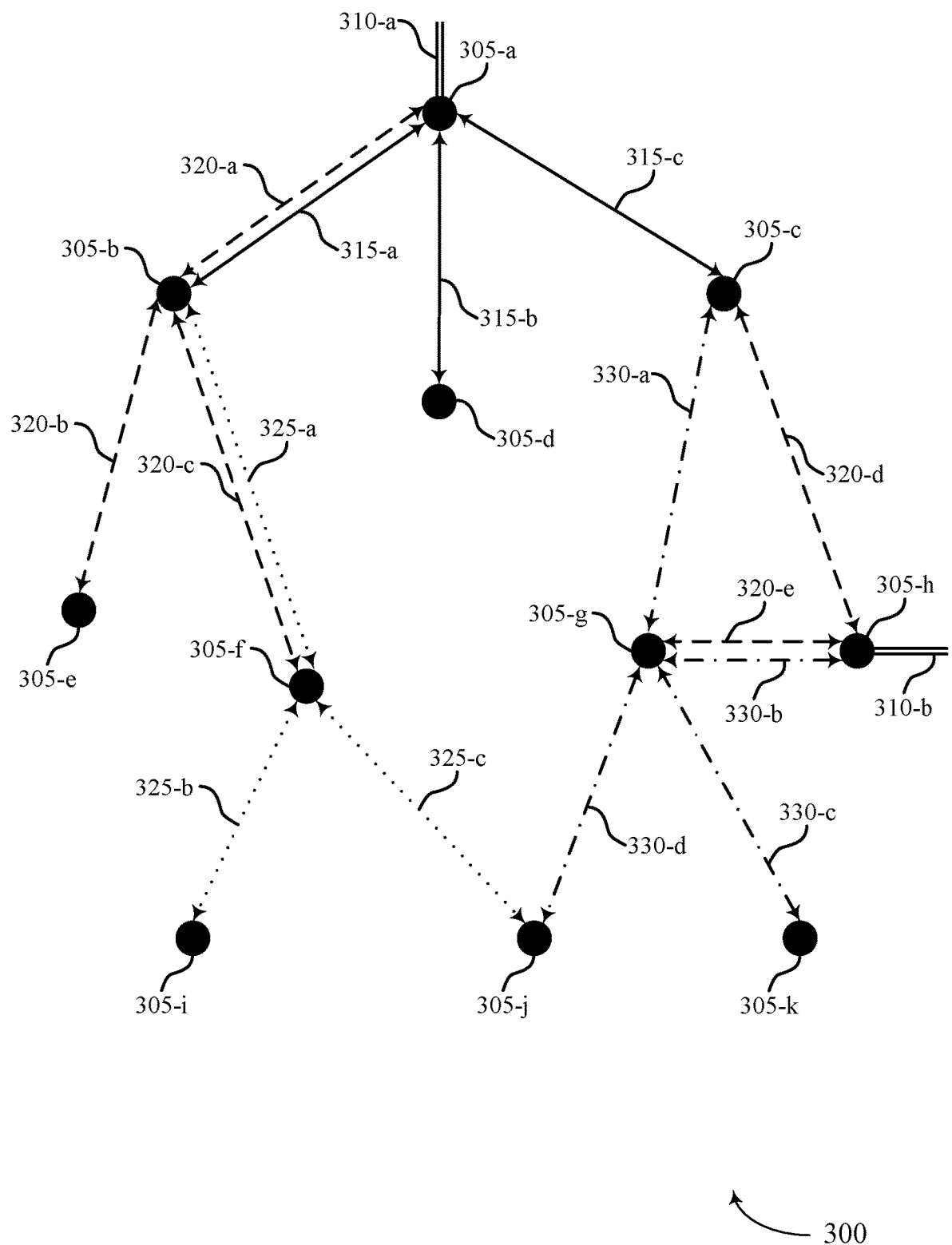
FIG. 3 illustrates an example of a network scheme that supports resource coordination for half duplex communications in accordance with aspects of the present disclosure.

FIG. 3 illustrates an example of a network scheme 300 that supports resource coordination for half duplex communications in accordance with various aspects of the present disclosure. In some examples, network scheme 300 may implement aspects of wireless communications systems 100 and/or 200. Network scheme 300 may include multiple nodes 305 communicating with each other over a system of wireless links (e.g., backhaul and/or access links). Each backhaul node may include multiple ANFs, UEFs, or a combination thereof. Nodes 305-*a* and 305-*h* may be coupled with wireline backhaul links 310-*a* and 310-*b*, respectively, to provide interfaces to a wireline network. As shown in network scheme 300, nodes 305-*a*, 305-*b*, 305-*f*, 305-*g*, and 305-*h* may include both ANF and UEF functionalities (e.g., transmitting and receiving data over respective links). Alternatively, nodes 305-*c*, 305-*d*, 305-*e*, 305-*i*, 305-*j*, and 305-*k* may only include UEF functionality (e.g., only receive data over respective links).

Network scheme 300 may include multiple stars, as described herein. Accordingly, some stars may overlap, where an ANF is located at the center of each star and UEFs are located at the leaves of the stars. Each star center (e.g., ANF) may utilize a same set of resources for each link stemming from the center of the star (e.g., according to a coloring scheme). For example, node 305-a may utilize a first resource on a first set of links 315, node 305-b may utilize a second resource on a second set of links 320, node 305-f may utilize a third resource on a third set of links 325, and node 305-g may utilize a fourth resource on a fourth set of links 330.

Additionally, each node 305 may determine how to partition its respective resource set for each of its corresponding links. For example, node 305-a may utilize a first partition of the first resource to communicate with node 305-b (e.g., link 315-a), a second partition of the first resource to communicate with node 305-d (e.g., link 315-b), and a third partition of the first resource to communicate with node 305-c (e.g., link 315-c). Node 305-b may utilize a first partition of the second resource to communicate with node 305-a (e.g., link 320-a), a second partition of the second resource to communicate with node 305-e (e.g., link 320-b), and a third partition of the second resource to communicate with node 305-f (e.g., link 320-c). Node 305-f may utilize a first partition of the third resource to communicate with node 305-b (e.g., link 325-a), a second partition of the third resource to communicate with node 305-i (e.g., link 325-b), and a third partition of the third resource to communicate with node 305-j (e.g., link 325-c). Node 305-g may utilize a first partition of the fourth resource to communicate with node 305-c (e.g., link 330-a), a second partition of the fourth resource to communicate with node 305-h (e.g., link 330-b), a third partition of the fourth resource to communicate with node 305-k (e.g., link 330-c), and a fourth partition of the fourth resource to communicate with node 305-j (e.g., link 330-d).

As shown, overlapping or touching stars (e.g., connected over backhaul links) do not share the same resources. However, if the stars are disjointed (e.g., not connected over backhaul links), the same resources may be used for the star. For example, node 305-h may utilize the second resource on a fifth set of backhaul links along with node 305-b because no backhaul links exist between the two nodes 305. As described herein, node 305-h may decide how to partition the second resource for each of its corresponding links. In some cases, the partitioning may take into account how node 305-b partitions the second resource for its links. For example, node 305-h may utilize a fourth partition of the second resource to communicate with node 305-c (e.g., link 320-d) and a fifth partition of the second resource to communicate with node 305-g (e.g., link 320-e). Alternatively, node 305-c may partition the second resource independently of how node 305-b partitions the second resource for its links. In some cases, the nodes may partition the resources based on time, frequency, space, code, or a combination thereof. Further, resources may be partitioned (e.g., by a centralized scheduler or an ANF of an AN 305) based on the type of link (access or backhaul).

In some cases, resources may be partitioned into two groups such that each group of resources is assigned to one of two node sets. The node sets may be groups of nodes 305 that are configured such that a node 305 is in a different node set than its parent and child nodes. For example, nodes 305-a, 305-e, 305-f, 305-g, and 305-h may be grouped into a first node set, and nodes 305-b, 305-c, 305-d, 305-I, 305-j, and 305-k may be grouped into a second node set. Resources may be assigned to the two node sets such that during the resources assigned to a nose set the nodes 305 belonging to the node set may freely schedule transmissions while the nodes 305 that do not belong to the node set may configure the resources in a constrained manner. In some examples, nodes 305-g and 305-h may exchange messages via links 320-e and 330-b. The messages may include information related to scheduling or D2D communications. In other cases, the messages may be control messages exchange via backhaul links.

When a node 305 configures resources in a constrained manner, the node 305 may utilize resources that are not configured for uplink or downlink transmissions by the parent and child nodes of the node 305. For example, during the set of resources assigned to the first node set, node 305-b may identify that its parent nodes (e.g., nodes 305-a, 305-e, and 305-f) are not configured for either uplink or downlink transmissions during a first resource. Node 305-b may determine that the first resource is free for scheduling transmissions, and node 305-b may then determine to schedule transmissions on the first resource, even though the resource is not assigned to the node set of node 305-b (e.g., the second node set).

In some cases, determining to schedule transmissions during resources not assigned to node 305 may be based at least in part on the node 305 determining a direction table. The direction table may indicate the communication directions the node 305 must adhere to during resources. The direction table may be determined during the resources that are not assigned to the node 305 based on the resource configurations of the parent and child nodes of the node 305. For example, during the resources that are assigned to the first node set, node 305-b may receive the resource configurations of its parent nodes (e.g., nodes 305-a, 305-e, and 305-f). Node 305-b may identify that nodes 305-a, 305-e, and 305-f are configured for downlink transmissions during a first resource. Node 305-b may then configure its direction table for uplink transmissions during the first resource. In other examples, node 305-b may determine that nodes 305-a, 305-e, and 305-f are configure as flexible during a first resource, which means that nodes 305-a, 305-e, and 305-f may be configured for either uplink or downlink transmissions through further signaling. Node 305-b may then configure its direction table as flexible during the first resource, which may indicate that node 305-b may schedule its own transmissions during the first resource.

Figure 4:
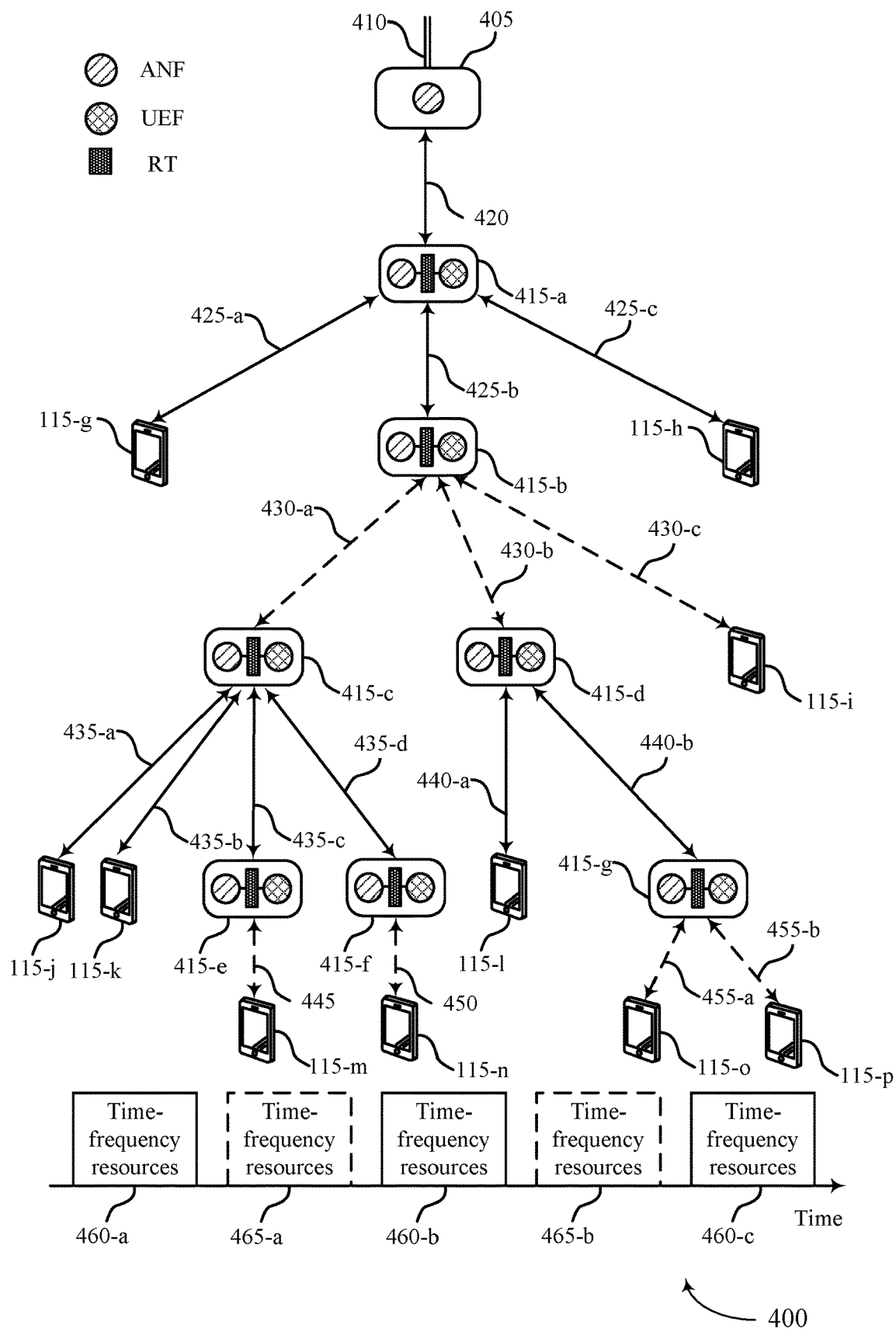
FIGS. 4 and 5 illustrate examples of wireless communications systems that support resource coordination for half duplex communications in accordance with aspects of the present disclosure.

FIG. 4 illustrates an example of a wireless communications system 400 that supports resource coordination for half duplex communications in accordance with various aspects of the present disclosure. In some examples, wireless communications system 400 may implement aspects of wireless communications system 100 and/or 200. Wireless communications system 400 may include an anchor cell 405 that is coupled with wireless backhaul link 410 to provide interfaces to a wireline network for a system. Further, backhaul and/or access links connect anchor cell 405 to one or more UEs 115 (e.g., UEs 115-g, 115-h, and 115-i) and cells 415, which may relay information or be further connected to additional UEs 115 and cells 415 over additional backhaul and/or access links (e.g., according to network scheme 300 of FIG. 3). The backhaul and/or access links may include wireless links. Each cell 415 may include an ANF, UEF, RT, or a combination thereof.

In some cases, anchor cell 405 may be connected to a first set of nodes over links 420. For example, anchor cell 405 may communicate with a cell 415-a over link 420. As cell 415-a includes an ANF, it may further be connected to a second set of nodes over link 425. For example, cell 415-*a* may communicate with a UE 115-*g* over link 425-*a*, a cell 415-*b* over link 425-*b*, and a UE 115-*h* over link 425-*c*. Cell 415-*b* includes an ANF, it may further be connected to a third set of nodes over links 430. For example, cell 415-*b* may communicate with a cell 415-*c* over link 430-*a*, a cell 415-*d* over link 430-*b*, and a UE 115-*i* over link 430-*c*. As cell 415-*c* includes an ANF, it may further be connected to a fourth set of nodes over links 435. For example, cell 415-*c* may communicate with a UE 115-*j* over link 435-*a*, a UE 115-*k* over link 435-*b*, a cell 415-*e* over link 435-*c*, and a cell 415-*f* over link 435-*d*. Similarly, cell 415-*d* may further include an ANF and be connected to a fifth set of nodes over links 440. For example, cell 415-*d* may communicate with a UE 115-*l* over link 440-*a* and a cell 415-*g* over link 440-*b*. As cell 415-*e* includes an ANF, it may further be connected to a UE 115-*m* over link 445. Similarly, cell 415-*f* includes and ANF, it may further be connected to a UE 115-*n* over link 450. Cell 415-*g* includes an ANF, it may further be connected to a UE 115-*o* over link 455-*a* and a UE 115-*p* over link 455-*b*.

The nodes of wireless communications system 400 may be partitioned into two node sets such that each node belongs to a different node set than its parent nodes and its child nodes. For example, cell 415-*a*, cell 415-*c*, and cell 415-*d* may be grouped in a first node set, while cell 415-*b*, cell 415-*e*, cell 415-*f*, and cell 415-*g* may be grouped in a second node set. Similarly, a set of resources may be partitioned into two sets such that each resource set is assigned to one of the node sets. For example, the set of resources may be partitioned into two sets for downlink, uplink, and/or flexible segments (e.g., time-frequency resources 460 and 465). As shown, the time-frequency resources 460 and 465 are partitioned based on the time domain such that a number of symbols span each of time-frequency resources 460 and 465. Further, the sets alternate according to repetition pattern (e.g., which may be known or preconfigured (e.g., by an anchor AN 405 or a node of the core network). The first set of resources may include time-frequency resources 460-*a*, 460-*b*, and 460-*c* and may be assigned to the first node set. The second set of resources may include time-frequency resources 465-*a* and 465-*b* and may be assigned to the second node set. In this case, the nodes of the first node set may have guaranteed performance and full resource allocation freedom (e.g., for scheduling) during the time period allocated to the time-frequency resources 460, while nodes of the second node set may be constrained (limited or no scheduling) during the time period allocated to the time-frequency resources 460. Similarly, during the time period allocated to the time-frequency resources 465, the nodes belonging to the first node set may be constrained (limited or no scheduling) while the nodes belonging to the second node set may have guaranteed performance and full resource allocation freedom (e.g., for scheduling). When a node belonging to a given node set is constrained, the node may utilize the resources assigned to the other node set based on the scheduling of the node's parent and child nodes. For example, when cell 415-*b* belongs to a first node set, cell 415-*b* may utilize resources assigned to the second node set (e.g., time-frequency resources 465) based on communication directions scheduled for cell 415-*a*, cell 415-*c*, and cell 415-*d* during time-frequency resources 465.

Figure 5:
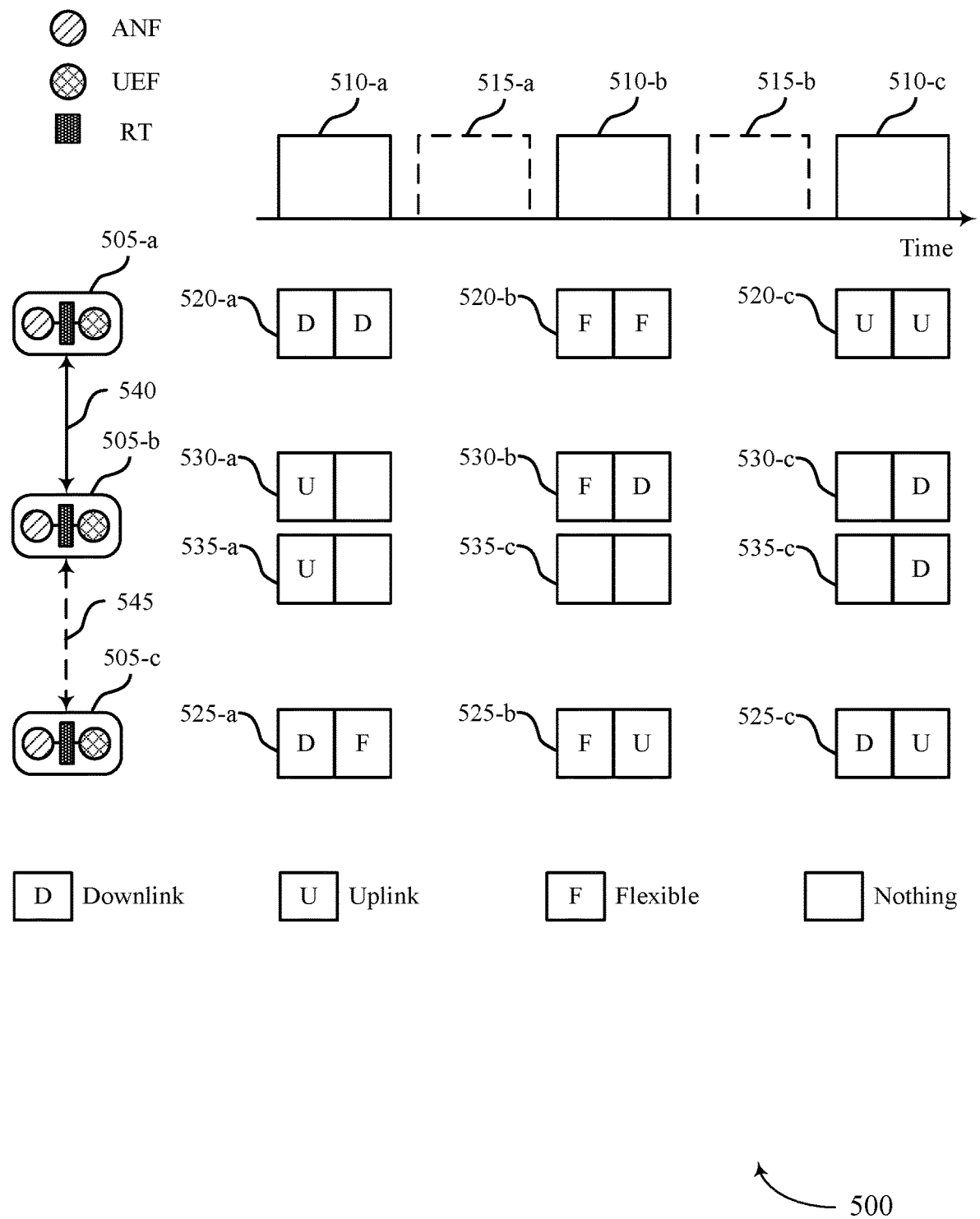

FIG. 5 illustrates an example of a wireless communications system 500 that supports resource coordination for half duplex communications in accordance with various aspects of the present disclosure. In some examples, wireless communications system 500 may implement aspects of wireless communications systems 100, 200, and/or 400, and may be an example of a wireless communications network that operates in mmW spectrum. The wireless communications system 500 may include a number of cells 505 that communicate over a combination of wired and wireless links. The cells 505 may be examples of the ANs 105 and 205 as described in reference to FIGS. 1 and 2.

In some cases, a wireless communications system may utilize an enhanced slot structure that defines flexible symbols as either free flexible symbols or non-free flexible symbols. The flexible symbols may be defined in this manner for relay nodes of a node set that are utilizing a resource set assigned to the node set. For example, cell 505-*a* and cell 505-*c* may be grouped into a first node set that is assigned time-frequency resources 510, and cell 505-*b* may be grouped into a second node set that is assigned time-frequency resources 515, as described with reference to FIG. 4. When cell 505-*a* and cell 505-*c* utilize time-frequency resources 510, cell 505-*a* and cell 505-*c* may define flexible resource units (e.g., one or more symbols or slots) as free flexible or as non-free flexible. In such a case, the flexible resource units may be utilized by cell 505-*b*, which is a child node of cell 505-*a* and a parent node of cell 505-*c*, in a constrained manner. A free flexible resource unit may be a flexible resource unit that cell 505-*a* or cell 505-*c* will not schedule uplink or downlink transmissions on, and thus may be utilized by cell 505-*b* during time-frequency resources 510. A non-free flexible symbol may be a flexible symbol that cell 505-*a* or cell 505-*b* may schedule uplink or downlink transmissions on, and thus may not be utilized by cell 505-*b* during time-frequency resources 510.

In some cases, the designation of a free flexible symbol may be indicated by a bitmap. However, when utilizing a dynamic slot configuration through SFI, a bit map indication may have a high signaling overhead cost. In some cases, indicating the designation of a free flexible symbol may be more efficient through RRC messaging, which may be transmitted to a relay node for determining free flexible symbol designation. The RRC message may specify a ratio of total flexible symbols in a given slot structure as free flexible (e.g., 1, 1/2, or 1/3), and the location of the free flexible symbols may be fixed. When assigned a ratio for free flexible symbols, a node may first assign flexible symbols as non-free flexible before assigning the flexible symbols as free flexible. For example, cell 505-*a* may be configured with a free flexible symbol ratio of 1/2, such that for every 2 flexible symbols configured in the slot structure of cell 505-*a*, cell 505-*a* may assign the first flexible symbol as non-free flexible and second flexible symbol as free flexible. In another example, cell 505-*a* may be configured with a free flexible symbol ratio of 1/2, such that cell 505-*a* may assign the first half of all of the flexible symbols as non-free flexible and the second half of all of the flexible symbols as free flexible. Such a semi-static configuration may result in smaller signaling overhead. In some cases, a relay node (e.g., cell 505-*b*) may indicate, to its parent and child nodes (e.g., cell 505-*a* and cell 505-*b*), the ratio for free flexible symbols through RRC messaging. In such a case, the location of the free flexible symbols may be fixed.

In some cases, the enhanced slot structures of a parent node and a child node (e.g., cell 505-*a* and cell 505-*c*, respectively) of a relay node (e.g., cell 505-*b*) may be used to determine a direction table for the relay node. For example, enhanced slot structure 520 may be the enhanced slot structure of cell 505-*a*, which may be the parent node of cell 505-*b*, and enhanced slot structure 525 may be the enhanced slot structure of cell 505-*c*, which may be the child node of cell 505-*b*. The direction table may be used to determine the functionality of the relay node during a period associated with a resource set that is not assigned to the relay node. For example, if enhanced slot structure 520 and enhanced slot structure 525 designate the resource units (e.g., slots or symbols) corresponding to time-frequency resources 510 of cell 505-*a* and cell 505-*c* as uplink units or free flexible units, the direction table 530 of cell 505-*b* may be configured for downlink during the resource units of time-frequency resource 510-*a*.

Similarly, if enhanced slot structure 520 and enhanced slot structure 525 designate the resource units (e.g., slots or symbols) corresponding to time-frequency resources 510 of cell 505-*a* and cell 505-*c* as downlink units or free flexible units, the direction table 530 of cell 505-*b* may be configured for uplink during the resource units of time-frequency resources 510. If enhanced slot structure 520 and enhanced slot structure 525 designate the resource units (e.g., slots or symbols) corresponding to time-frequency resources 510 of cell 505-*a* and cell 505-*c* as free flexible units, the direction table of cell 505-*b* may be configured as flexible during the resource units of time-frequency resources 510. In other cases, direction table 530 of cell 505-*b* may be designated for nothing during the resource unit. When direction table 530 configures cell 505-*b* for downlink (or uplink) during time-frequency resource 510-*a*, for example, cell 505-*b* must perform downlink (or uplink) transmissions during time-frequency resource 510-*a*. When direction table 530 configures cell 505-*b* as flexible during time-frequency resource 510-*a*, for example, cell 505-*b* may schedule uplink or downlink transmissions during time-frequency resource 510-*a*. When direction table 530 is configured as nothing during time-frequency resource 510-*a*, for example, cell 505-*b* may not schedule any uplink or downlink traffic during time-frequency resource 510-*a*. Such a configuration may allow cell 505-*b* to more efficiently utilize time-frequency resources 510, which may not be assigned to cell 505-*b*.

For example, time-frequency resources 510 and 515 may be partitioned into two groups and each group may be assigned to one of two node sets such that a child node is not assigned to the same node set as its parent node, as described with reference to FIG. 4. Cells 505-*a* and 505-*c* may be assigned to a first node set, and the first node set may be assigned to the resource set that includes time-frequency resources 510. Cell 505-*b* may be assigned to a second node set, and the second node set may be assigned to the resource set that includes time-frequency resources 515. Thus, during the period of time-frequency resources 510-*a*, 510-*b*, and 510-*c*, the enhanced slot structures of cell 505-*a* and cell 505-*c* may be used determine a direction table 530 for cell 505-*b*.

For example, enhanced slot structure 520 may configure the resource units of cell 505-*a* as uplink, downlink, or flexible units during the time periods corresponding to time-frequency resources 510, and enhanced slot structure 525 may configure the resource units of cell 505-*c* as uplink, downlink, or flexible units during the time periods corresponding to time-frequency resources 515. In some cases, the free flexible ratio assigned to cell 505-*a* may be 1, such that every flexible resource unit assigned to cell 505-*a* may be designated as a free flexible resource unit, and the free flexible ratio assigned to cell 505-*c* may be 1/2, such that the second flexible resource unit of every two flexible resource units assigned to cell 505-*c* may be designated as a free flexible resource unit. In some cases, the assignment of a free flexible ratio of 1/2, for example, may indicate that the first half of all of the flexible resource units should be configured as non-free flexible and that the second half of all of the flexible resource units should be configured as free flexible.

During the period of time-frequency resource 510-*a*, the enhanced slot structure 520-*a* of cell 505-*a* may be configured such that the first resource unit is assigned for downlink and the second resource unit is assigned for downlink, and the enhanced slot structure 525-*a* of cell 505-*c* may be configured such that the first resource unit is assigned for downlink and the second resource unit is assigned as non-free flexible. The resulting direction table 530-*a* for cell 505-*b* corresponding to the time period of time-frequency resource 510-*a* may be configured for uplink during the first resource unit and for nothing for the second resource unit.

During the period of time-frequency resource 510-*b*, the enhanced slot structure 520-*b* of cell 505-*a* may be configured such that the first resource unit and the second resource unit are assigned as free flexible, and the enhanced slot structure 525-*b* of cell 505-*c* may be configured such that the first resource unit is assigned as free flexible and the second resource unit is assigned for uplink. The resulting direction table 530-*b* for cell 505-*b* corresponding to the time period of time-frequency resource 510-*b* may be configured as flexible during the first resource unit and for downlink for the second resource unit.

During the period of time-frequency resource 510-*c*, the enhanced slot structure 520-*c* of cell 505-*a* may be configured such that the first resource unit and the second resource unit are assigned for uplink, and the enhanced slot structure 525-*c* of cell 505-*c* may be configured such that the first resource unit is assigned for downlink and the second resource unit is assigned for uplink. The resulting direction table 530-*c* for cell 505-*b* corresponding to the time period of time-frequency resource 510-*c* may be configured for nothing during the first resource unit of and for downlink for the second resource unit.

In some examples, cells 505-*a*, 505-*b*, and 505-*c* may utilize existing slot structures, where flexible resource units are not further configured as free flexible or non-free flexible. The direction table 535 for cell 505-*b* may be configured for nothing when the slot structures of cell 505-*a* and cell 505-*c* are configured as flexible.

During the period of time-frequency resource 510-*a*, the enhanced slot structure 520-*a* of cell 505-*a* may be configured such that the first resource unit is assigned for downlink and the second resource unit is assigned for downlink, and the enhanced slot structure 525-*a* of cell 505-*c* may be configured such that the first resource unit is assigned for downlink and the second resource unit is assigned as flexible. The resulting direction table 535-*a* for cell 505-*b* corresponding to the time period of time-frequency resource 510-*a* may be configured for uplink during the first resource unit and for nothing for the second resource unit.

During the period of time-frequency resource 510-*b*, the enhanced slot structure 520-*b* of cell 505-*a* may be configured such that the first resource unit and the second resource unit are assigned as flexible, and the enhanced slot structure 525-*b* of cell 505-*c* may be configured such that the first resource unit is assigned as flexible and the second resource unit is assigned for uplink. The resulting direction table 535-*b* for cell 505-*b* corresponding to the time period of time-frequency resource 510-*b* may be configured for nothing during the first resource unit and the second resource unit.

During the period of time-frequency resource 510-*c*, the enhanced slot structure 520-*c* of cell 505-*a* may be configured such that the first resource unit and the second resource unit are assigned for uplink, and the enhanced slot structure 525-c of cell 505-c may be configured such that the first resource unit is assigned for downlink and the second resource unit is assigned for uplink. The resulting direction table 535-c for cell 505-b corresponding to the time period of time-frequency resource 510-c may be configured for nothing during the first resource unit of and for downlink for the second resource unit.

In some cases, direction table 530 (e.g., or direction table 535) may be determined using a centralized approach. In such an approach, a central entity (e.g., an anchor node) may determine the slot structure or the enhanced slot structure for cell 505-a and cell 505-b time periods corresponding to time-frequency resources 510. The central entity may then determine direction table 530 for cell 505-b during the time periods corresponding to time-frequency resources 515.

In other cases, direction table may be determined using a distributed approach. In such a case, cell 505-a and cell 505-c may determine their slot structures or enhanced slot structures during the time periods corresponding to time-frequency resources 510, and cell 505-b may determine its slot structure or enhanced slot structure during the time periods corresponding to time-frequency resources 515. Each cell 505 may then exchange information related to its slot structure or enhanced slot structure with its parent nodes and child nodes. Cell 505-a and cell 505-c may then determine their own direction tables during time periods corresponding to time-frequency resources 515, and cell 505-b may determine its direction table during time periods corresponding to time-frequency resources 510, where determining the direction tables is based at least in part on the collected slot structure or enhanced slot structure information received from the parent nodes and child nodes of each cell 505.

For both the centralized approach and distributed approach, a single slot structure pattern may be determined for a relay node by combining the slot structure or enhanced slot structure information during time periods corresponding to the time-frequency resources assigned to the node set that the relay node belongs to with direction table information determined during time periods corresponding with the time-frequency resources assigned to the opposite node set as the relay node. When a slot structure or an enhanced slot structure is dynamically configured through SFI, a relay node may designate resources units assigned to the opposite node set as the relay node as flexible units, and the relay node may use dynamic DCI according to its direction table to override the flexible resources as needed.

A centralized approach may be based on a semi-static slot configuration, such that the semi-static slot configuration may be determined for cell 505-a and cell 505-c during time periods corresponding to time-frequency resources 510 and for cell 505-b during time periods corresponding to time-frequency resources 515 based at least in part on the long-term uplink and downlink traffic statistics cells 505. During time periods corresponding to time-frequency resources 510, a semi-static slot configuration for cell 505-b may be determined by a direction table of cell 505-b, and during time periods corresponding time-frequency resources 515, a semi-static slot configuration for cell 505-a and cell 505-b may be determined by direction tables of cell 505-a and cell 505-c.

A distributed approach may be based on dynamic slot configurations using SFI, such that the SFI may be determined for cell 505-a and cell 505-c during time periods corresponding to time-frequency resources 510 and for cell 505-b during time periods corresponding to time-frequency resources 515 based at least in part on the short-term uplink and downlink traffic demands of cells 505. Each cell 505 may then transmit their respective SFI in GC-PDCCH to its parent and child nodes. During time periods corresponding to time-frequency resources 515, cell 505-a and cell 505-c may determine their respective direction tables based on the SFI received from cell 505-b, and during time-frequency resources 510, cell 505-b may determine a direction table based on the SFIs received from cell 505-a and cell 505-c. During time periods corresponding to time-frequency resources 510, SFI for cell 505-b may be designated as flexible, which may be overridden by dynamic DCI as determined by the direction table of cell 505-b during time-frequency resources 515. During time periods corresponding to time-frequency resources 515, SFI for cell 505-a and cell 505-c may be designated as flexible, which may be overridden by dynamic DCI as determined by the direction tables of cell 505-a and cell 505-c during time-frequency resources 510. Overriding the SFI is based on the direction table of a relay node as well as determined transmission regulations. In some cases, such a dynamic distributed approach may result in higher time-frequency resource utilization than a semi-static centralized approach. The dynamic distributed approach may result in higher signaling overhead that a semi-static centralized approach, since each relay node may need to periodically exchange SFI with the parent and child relay nodes.

In some cases, a centralized approach with semi-static slot configurations may be utilized, such that there is one semi-static slot configuration for each node set. For example, cell 505-a and cell 505-c may be grouped into a first node set that is assigned with time-frequency resources 510, and cell 505-b may be grouped in a second node set that is assigned with time-frequency resources 515. In such a case, the slot structures of the cells 505 of the first node set may be complementary in direction to the slot structure of the cell 505 of the second node set, where uplink and downlink are complimentary directions, and flexible and nothing are complimentary directions. Accordingly, when cell 505-a and cell 505-c are configured for uplink, downlink, flexible, or nothing during time-frequency resources 510, cell 505-b may be configured for downlink, uplink, nothing, or flexible, respectively, during time-frequency resources 515. Similarly, when cell 505-b is configured for uplink, downlink, flexible, or nothing during time-frequency resources 515, cell 505-a and cell 505-c may be configured for downlink, uplink, nothing, or flexible, respectively, during time-frequency resource 515.

Cell 505-b may determine that any interference it causes with its cell 505-a and cell 505-c may be sufficiently small before utilizing time-frequency resources 510. When controlling interference, cell 505-b may collect transmission regulation information (e.g., allowed range of beam directions, beam width, and transmission power) from cell 505-a and cell 505-c to regulate the downlink and uplink transmissions on the control link 540 and control link 545 during time periods corresponding to time-frequency resources 510. In an IAB network, cells 505 may have fixed locations and may form narrow beams using a large number of antennas, which may simplify interference management and reduce signaling overhead.

In some cases, cells 505 may receive the slot structure information from their child nodes through a signaling message in a physical uplink control channel (PUCCH).

Additionally or alternatively, the signaling message may be included in physical uplink shared channel (PUSCH) with a new MAC CE defined.

Some control channels (e.g., physical downlink control channel (PDCCH), synchronization channel (SYNC), physical random access channel (PRACH), PUCCH) may not be scheduled, and their resources may be preconfigured in time by a SIB or by RRC. Since control channel imply a specific transmission direction (e.g., uplink or downlink), it may be desirable to allocate control channels for a relay node (e.g., cell 505-a) with time-frequency resources assigned to the node set of the relay node (e.g., time-frequency resources 510) to guarantee control channel transmission. Such an allocation may result in the controls of a relay node being transmitted orthogonally from the parent and child nodes of the relay nodes, which may be desirable for cases that require the control channels to be protected. Further, because some control channels may be associated with timing requirements, such an allocation may constrain resource partitioning. For example, 5G NR defines the maximum scheduling time between a PDCCH DCI grant and a data transmission (e.g., PUSCH or PUCCH). Since PDCCH for a relay node is allocated at time-frequency resources assigned to the node set of the relay node, the relay node may be responsible for scheduling data transmissions on both time-frequency resource sets (e.g., time-frequency resources 510 and 515), which would allow both time-frequency resource sets to be within the maximum scheduling time of the closest previous PDCCH (in units of time) for the relay node.

In some aspects, cell 505-a and cell 505-c may be grouped into a first node set that is assigned with time-frequency resources 510, and cell 505-b may be grouped in a second node set that is assigned time-frequency resources 515. The downlink and uplink control channels may be allocated for cell 505-a and cell 505-c during time-frequency resources 510, and the downlink and uplink control channels may be allocated for cell 505-b during time-frequency resources 515.

In some cases, control channels may be configured at both the resource set that is assigned to the node group of a relay node and the resource set that is not assigned to the node group of the relay node. In such cases, control channels may first be allocated at time-frequency resources assigned to the node set of a relay node. It may be beneficial to follow the same allocation pattern for each relay node in the node set, which may result in the parent and child nodes of each relay node having consistent transmission directions. The direction table for the control channels of a relay node may then be configured during the time periods corresponding to the time-frequency resources assigned to the opposite node set as the relay node. The control channels of a relay node may be assigned based on the direction table of the relay node during time periods corresponding to the time-frequency resources assigned to the opposite node set as the relay node. The control channel allocations may then be combined at resource sets to create a resource configuration of control channels for each relay node.

For example, cell 505-a and cell 505-c may be grouped into a first node set that is assigned with time-frequency resources 510, and cell 505-b may be grouped in a second node set that is assigned time-frequency resources 515. During the time periods corresponding to time-frequency resources 510, the control channels of cell 505-a and cell 505-c may be allocated, and during the time periods corresponding to time-frequency resources 515, the control channels of cell 505-b may be allocated. During the time periods corresponding to time-frequency resources 510, the direction table for the control channels of cell 505-b may be configured, and during the time periods corresponding to time-frequency resources 515, direction tables for the control channels of cell 505-a and cell 505-c may be configured. Based on the direction tables, the control channels of cell 505-a and cell 505-c may be scheduled during the time periods corresponding to time-frequency resources 515, and the control channels of cell 505-b may be scheduled during the time periods corresponding to time-frequency resources 510. The control channel allocations may then be combined at both time-frequency resources 510 and time-frequency resources 515 to create a resource configuration of control channels for each cell 505.

Figure 6:
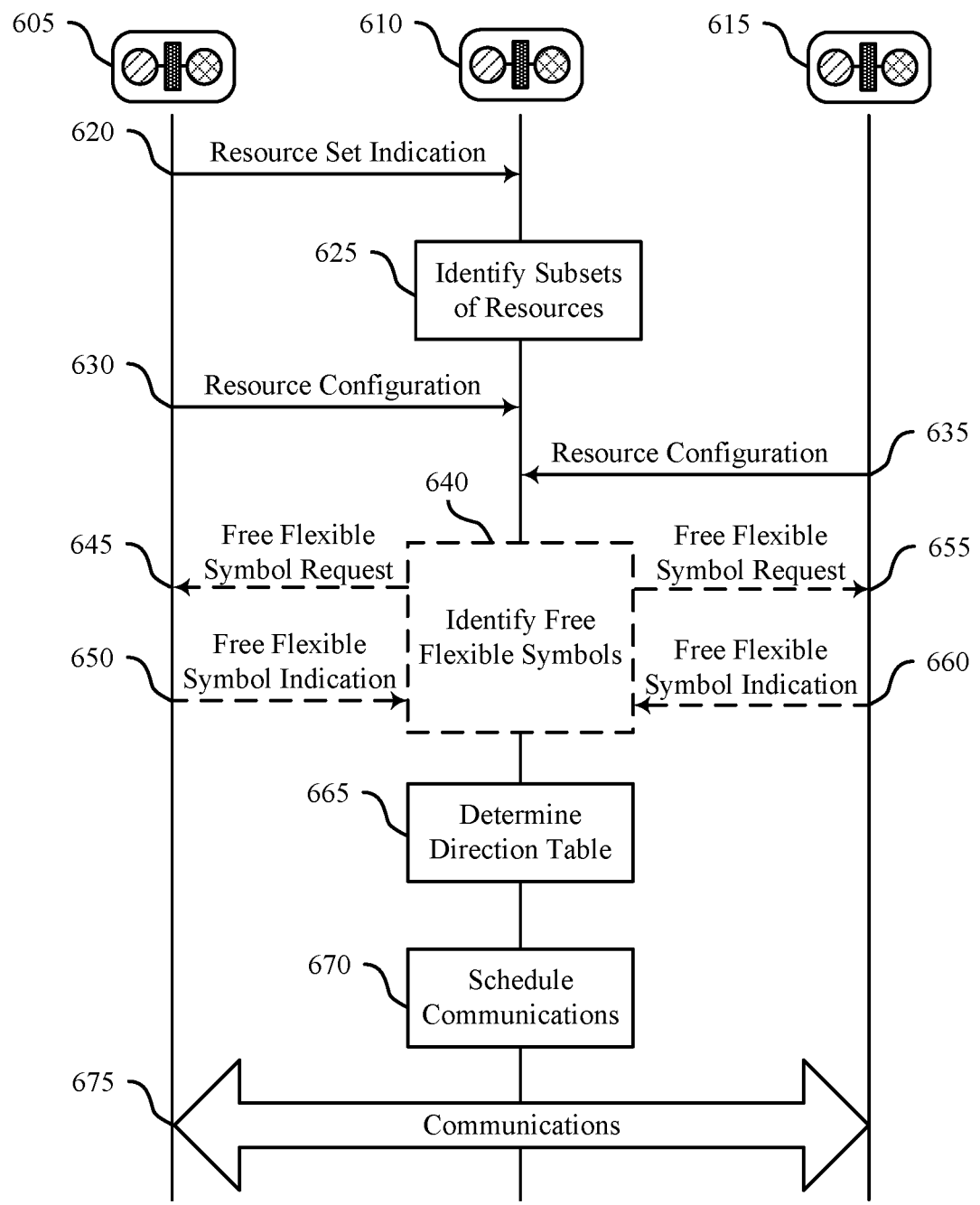
FIGS. 6 and 7 illustrate examples of process flows that support resource coordination for half duplex communications in accordance with aspects of the present disclosure.

FIG. 6 illustrates an example of a process flow 600 that supports resource coordination for half duplex communications in accordance with various aspects of the present disclosure. In some examples, process flow 600 may be implemented by aspects of wireless communications systems as described herein. Parent network node 605 may be denoted as a scheduling AN (or anchor) and may enable ANF functionality. Parent network node 605 may implement UEF functionality for communication with an alternative entity coupled to parent network node 605, or for topological redundancy in the network. Relay node 610 may be denoted as a receiving AN and may enable UEF functionality. In some cases, relay node 610 may additionally implement ANF functionality for communication with an alternative entity coupled to relay node 610. Child network node 615 may be denoted as a receiving AN and may enable UEF functionality. In some cases, child network node 615 may additionally implement ANF functionality for communication with an alternative entity coupled to child network node 615.

In the following description of the process flow 600, the operations between parent network node 605, relay node 610, and child network node 615 may correspond to uplink or downlink signaling over wireless backhaul links and/or wireless access links. Signaling between parent network node 605, relay node 610, and child network node 615 may be direct, or indirect, according to a mesh topology of the backhaul network.

At 620, relay node 610 may receive a resource allocation scheme from parent network node 605 (e.g., or an anchor network node), where the resource allocation scheme indicates a first subset and a second subset of a set of resources.

At 625, relay node 610 may identify a set of resources, where the set of resources may be partitioned into the first subset of resources for relay node 610 and the second subset of resources for parent network node 605 and child network node 615. In some cases, the first subset of resources may be assigned for relay node 610 and the second subset of resources may be assigned for one or both of the parent network node 605 and the child network node 615.

At 630, relay node 610 may receive, from parent network node 605, a first resource configuration for a slot of the second subset of resources. The first resource configuration may be received via a semi-static cell-specific message, a semi-static UE-specific message, or a group-common control channel. The semi-static cell-specific message may be received via a SIB. The semi-static UE-specific message may be received via RRC signaling. The group-common control channel may be received via a GC-PDCCH and may include an SFI.

At 635, relay node 610 may receive, from child network node 615, a second resource configuration for the slot of the second subset of resources. In some cases, relay node 610 may transmit, to child network node 615, a request for the second resource configuration. Relay node 610 may receive, from child network node 615, the second resource configuration in response to the request. In some cases, the second resource configuration is received via a PUCCH or PUSCH.

At 640, relay node 610 may optionally identify the free flexible symbols of parent network node 605 and child network node 615, as described in 645-660. For example, at 645, relay node 610 may transmit, to parent network node 605, a request for a number of free flexible symbols of the slot of the second subset of resources. At 650, relay node 610 may receive, from parent network node 605, an indication of the number of free flexible symbols in response to the request. In some cases, relay node 610 may receive an RRC message that specifies a ratio of the number of free flexible symbols to a total number of flexible symbols of the slot. In some examples, the indication may include a bitmap that specifies whether a flexible symbol of the slot of the second subset of resources is free.

In some cases, at 655, relay node 610 may transmit, to child network node 615, a request for a number of free flexible symbols of the slot of the second subset of resources. At 660, relay node 610 may receive, from child network node 615, an indication of the number of free flexible symbols in response to the request. In some cases, relay node 610 may receive an RRC message that specifies a ratio of the number of free flexible symbols to a total number of flexible symbols of the slot. In some examples, the indication may include a bitmap that specifies whether a flexible symbol of the slot of the second subset of resources is free.

At 665, relay node 610 may a determine direction table for the slot of the second subset of resources based at least in part on the first and second resource configurations. The direction table may indicate a communication direction for a set of symbols of the slot of the second subset of resources.

In some examples, relay node 610 may determine, for a symbol of the slot of the second subset of resources, that parent network node 605 and child network node 615 are scheduled for downlink transmissions. Accordingly, relay node 610 may indicate the symbol of the slot of the second subset of resources as uplink based at least in part on determining that parent network node 605 and child network node 615 are scheduled for downlink transmissions.

In some cases, relay node 610 may determine, for a symbol of the slot of the second subset of resources, that parent network node 605 and child network node 615 are scheduled for uplink transmissions. Accordingly, relay node 610 may indicate the symbol of the slot of the second subset of resources as downlink based at least in part on determining that parent network node 605 and child network node 615 are scheduled for uplink transmissions.

In some instances, relay node 610 may determine, for a symbol of the slot of the second subset of resources, that parent network node 605 and child network node 615 are scheduled for different communication directions. Accordingly, relay node 610 may indicate the symbol of the slot of the second subset of resources as unavailable based at least in part on determining that parent network node 605 and child network node 615 are scheduled for different communication directions.

In some examples, relay node 610 may identify, for the slot of the second subset of resources, a first set of free flexible symbols for parent network node 605 or the child network node 615. Relay node 610 may determine, for a symbol of the slot of the second subset of resources, that parent network node 605 and child network node 615 are either free flexible or scheduled for downlink transmissions. Accordingly, relay node 610 may indicate the symbol of the slot of the second subset of resources as uplink based at least in part on determining that parent network node 605 and child network node 615 are either free flexible or scheduled for downlink transmissions.

In some cases, relay node 610 may identify, for the slot of the second subset of resources, a first set of free flexible symbols for parent network node 605 or the child network node 615. Relay node 610 may determine, for a symbol of the slot of the second subset of resources, that parent network node 605 and child network node 615 are either free flexible or scheduled for uplink transmissions. Accordingly, relay node 610 may indicate the symbol of the slot of the second subset of resources as downlink based at least in part on determining that parent network node 605 and child network node 615 are either free flexible or scheduled for uplink transmissions.

In some examples, relay node 610 may identify a slot structure for a slot of the first subset of resources, where the slot structure indicates a set of flexible symbols. Relay node 610 may divide the set of flexible symbols into a set of free flexible symbols and a set of non-free flexible symbols. Relay node 610 may transmit an indication of the set of free flexible symbols to parent network node 605 or the child network node 615. In some cases, the indication includes a bitmap that specifies whether a flexible symbol of the set of flexible symbols is free.

In some cases, relay node 610 may transmit an RRC message that specifies a ratio of a number of free flexible symbols to a total number of flexible symbols of the set of flexible symbols. Relay node 610 may determine the set of free flexible symbols based at least in part on a traffic demand of a cell supported by relay node 610.

Parent network node 605 or child network node 615 may transmit, to relay node 610, a request for a number of free flexible symbols, where the indication of the set of free flexible symbols may be transmitted by relay node 610 in response to the request.

At 670, relay node 610 may schedule communications in the slot of the second subset of resources based at least in part on the first and second resource configurations.

Relay node 610 may schedule communications on a slot of the first subset of resources independent of the first and second resource configurations. Relay node 610 may communicate with one or more devices during the slot of the first subset of resources according to the scheduled communications.

At 675, relay node 610 may communicate with one or more devices during the slot of the second subset of resources according to the scheduled communications.

In some cases, relay node 610 may identify transmission regulation information associated with the second subset of resources. Relay node 610 may identify transmission regulation information by receiving, from at least one of parent network node 605 and child network node 615, transmission regulation information associated with parent network node 605 or child network node 615. In some cases, the transmission regulation information may include a range of beam directions, a set of beam widths, or a transmission power. Relay node 610 may communicate with one or more devices during the slot of the second subset of resources based at least in part on the transmission regulation information.

In some cases, a control channel for the relay node 610 may be allocated to resources of the first subset of resources. The control channel may be associated with communications via the first or second subsets of resources. A second control channel for the relay node 610 may be allocated to resources of the second subset of resources. Relay node 610 may determine a direction table for the resources of the second subset of resources based at least in part on control channel configurations for parent network node 605 and child network node 615.

In some examples, relay node 610 may receive an indication of a control channel allocation for a control channel for relay node 610, where the control channel is associated with communications via the first or second subsets of resources.

Figure 7:
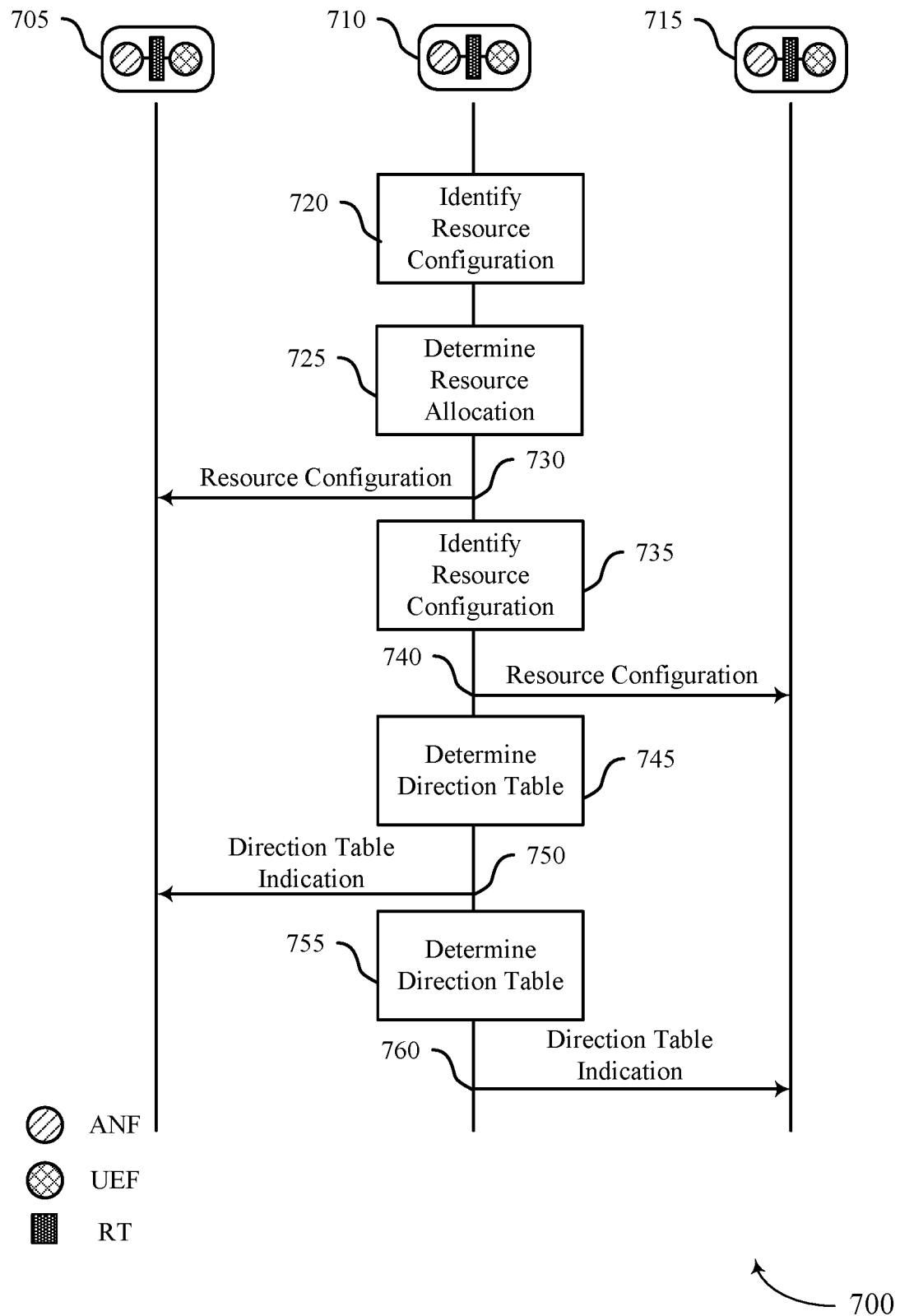

FIG. 7 illustrates an example of a process flow 700 that supports resource coordination for half duplex communications in accordance with various aspects of the present disclosure. In some examples, process flow 700 may be implemented by aspects of wireless communications systems as described herein. Relay node 705 may be denoted as a receiving AN and may enable UEF functionality. Anchor node 710 may be denoted as a scheduling AN and may enable ANF functionality. Relay node 715 may be denoted as a receiving AN and may enable UEF functionality. In some cases, anchor node 710 may configure resources and determine direction tables for relay node 705 and relay node 715.

At 720, anchor node 710 may determine a resource allocation scheme for relay node 705 and relay node 715, where the resource allocation scheme indicates a first subset and a second subset of a set of resources. In some cases, the first subset of resources may be assigned for relay node 705 and the second subset of resources may be assigned for relay node 715.

At 725, anchor node 710 may identify a first resource configuration for relay node 705. The first resource configuration may be for a slot of the first subset of resources.

At 730, anchor node 710 may transmit the first resource configuration to relay node 705 during the first subset of resources. The first resource configuration may be transmitted via a semi-static cell-specific message, a semi-static UE-specific message, or a group-common control channel. The semi-static cell-specific message may be received via a SIB. The semi-static UE-specific message may be received via RRC signaling. The group-common control channel may be received via a GC-PDCCH and may include an SFI.

At 735, anchor node 710 may identify a second resource configuration for relay node 715. The second resource configuration may be for a slot of the second subset of resources.

At 740, anchor node 710 may transmit the second resource configuration to relay node 715 during the second subset of resources. The second resource configuration may be transmitted via a semi-static cell-specific message, a semi-static UE-specific message, or a group-common control channel. The semi-static cell-specific message may be received via a SIB. The semi-static UE-specific message may be received via RRC signaling. The group-common control channel may be received via a GC-PDCCH and may include an SFI.

At 745, anchor node 710 may determine a first direction table for relay node 705. The first direction table may be for a slot of the second subset of resources. The first direction table may be based at least in part on the second resource configuration. The first direction table may indication a communication direction for a set of symbols of the slot of the second subset of resources.

In some cases, anchor node 710 may determine, for a symbol of the slot of the second subset of resources, that relay node 715 is scheduled for uplink transmissions. Accordingly, anchor node 710 may indicate the symbol of the slot of the second subset of resources as downlink based at least in part on determining that relay node 715 is scheduled for uplink transmissions.

In some cases, anchor node 710 may determine, for a symbol of the slot of the second subset of resources, that relay node 715 is scheduled for downlink transmissions. Accordingly, anchor node 710 may indicate the symbol of the slot of the second subset of resources as uplink based at least in part on determining that relay node 715 is scheduled for downlink transmissions.

In some cases, anchor node 710 may determine, for a symbol of the slot of the second subset of resources, that relay node 715 is scheduled for flexible transmissions. Accordingly, anchor node 710 may indicate the symbol of the slot of the second subset of resources as flexible based at least in part on determining that relay node 715 is scheduled for flexible transmissions.

At 750, anchor node 710 may transmit the first direction table to relay node 705. The first direction table may be transmitted during the second subset of resources.

At 755, anchor node 710 may determine a second direction table for relay node 715. The second direction table may be for a slot of the first subset of resources. The second direction table may be based at least in part on the first resource configuration. The second direction table may indicate a communication direction for a set of symbols of the slot of the first subset of resources.

In some cases, anchor node 710 may determine, for a symbol of the slot of the first subset of resources, that relay node 705 is scheduled for uplink transmissions. Accordingly, anchor node 710 may indicate the symbol of the slot of the first subset of resources as downlink based at least in part on determining that relay node 705 is scheduled for uplink transmissions.

In some cases, anchor node 710 may determine, for a symbol of the slot of the first subset of resources, that relay node 705 is scheduled for downlink transmissions. Accordingly, anchor node 710 may indicate the symbol of the slot of the first subset of resources as uplink based at least in part on determining that relay node 705 is scheduled for downlink transmissions.

In some cases, anchor node 710 may determine, for a symbol of the slot of the first subset of resources, that relay node 705 is scheduled for flexible transmissions. Accordingly, anchor node 710 may indicate the symbol of the slot of the first subset of resources as flexible based at least in part on determining that relay node 705 is scheduled for flexible transmissions.

At 760, anchor node 710 may transmit the second direction table to relay node 715. The second direction table may be transmitted during the first subset of resources.

Figure 8:
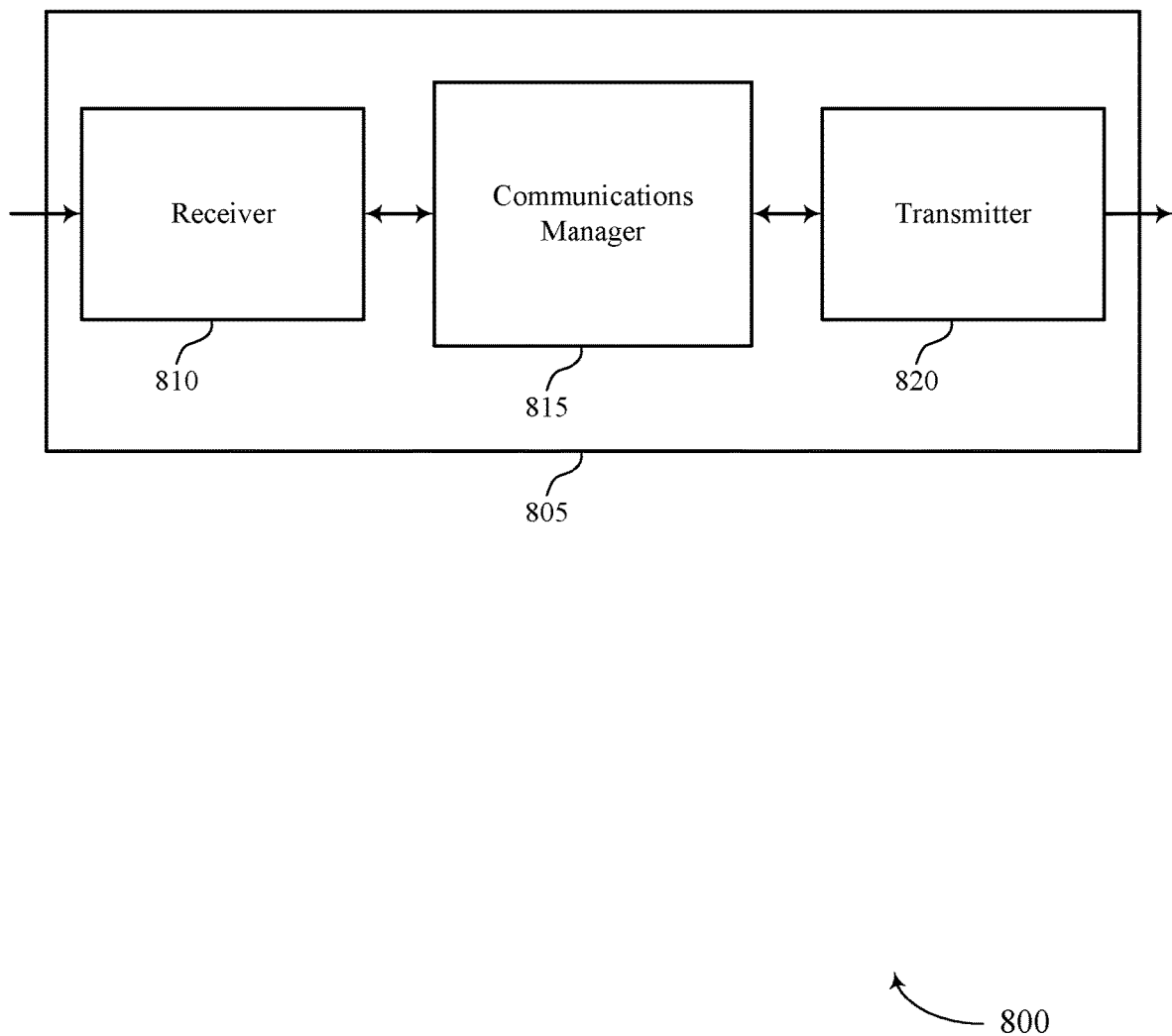
FIGS. 8 through 10 show block diagrams of a device that supports resource coordination for half duplex communications in accordance with aspects of the present disclosure.

FIG. 8 shows a block diagram 800 of a wireless device 805 that supports resource coordination for half duplex communications in accordance with aspects of the present disclosure. Wireless device 805 may be an example of aspects of a relay device (e.g., a UE 115, a base station 105, or an AN) as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resource coordination for half duplex communications). Information may be passed on to other components of the device. The receiver 810 may be an example of aspects of the transceiver 1135 described with reference to FIG. 11 or the transceiver 1235 as described with reference to FIG. 12. The receiver 810 may utilize a single antenna or a set of antennas.

Communications manager 815 may be an example of aspects of the UE communications manager 1115 described with reference to FIG. 11 or the base station communications manager 1215 as described with reference to FIG. 12. Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 815 may identify, at a relay device, a set of resources partitioned into a first subset of resources for the relay device and a second subset of resources for a parent network node and a child network node in communication with the relay device and receive, from the parent network node, a first resource configuration for a slot of the second subset of resources. Communications manager 815 may receive, from the child network node, a second resource configuration for the slot of the second subset of resources, schedule communications in the slot of the second subset of resources based on the first and second resource configurations, and communicate with one or more devices during the slot of the second subset of resources according to the scheduled communications.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11 or the transceiver 1235 as described with reference to FIG. 12. The transmitter 820 may utilize a single antenna or a set of antennas.

Figure 9:
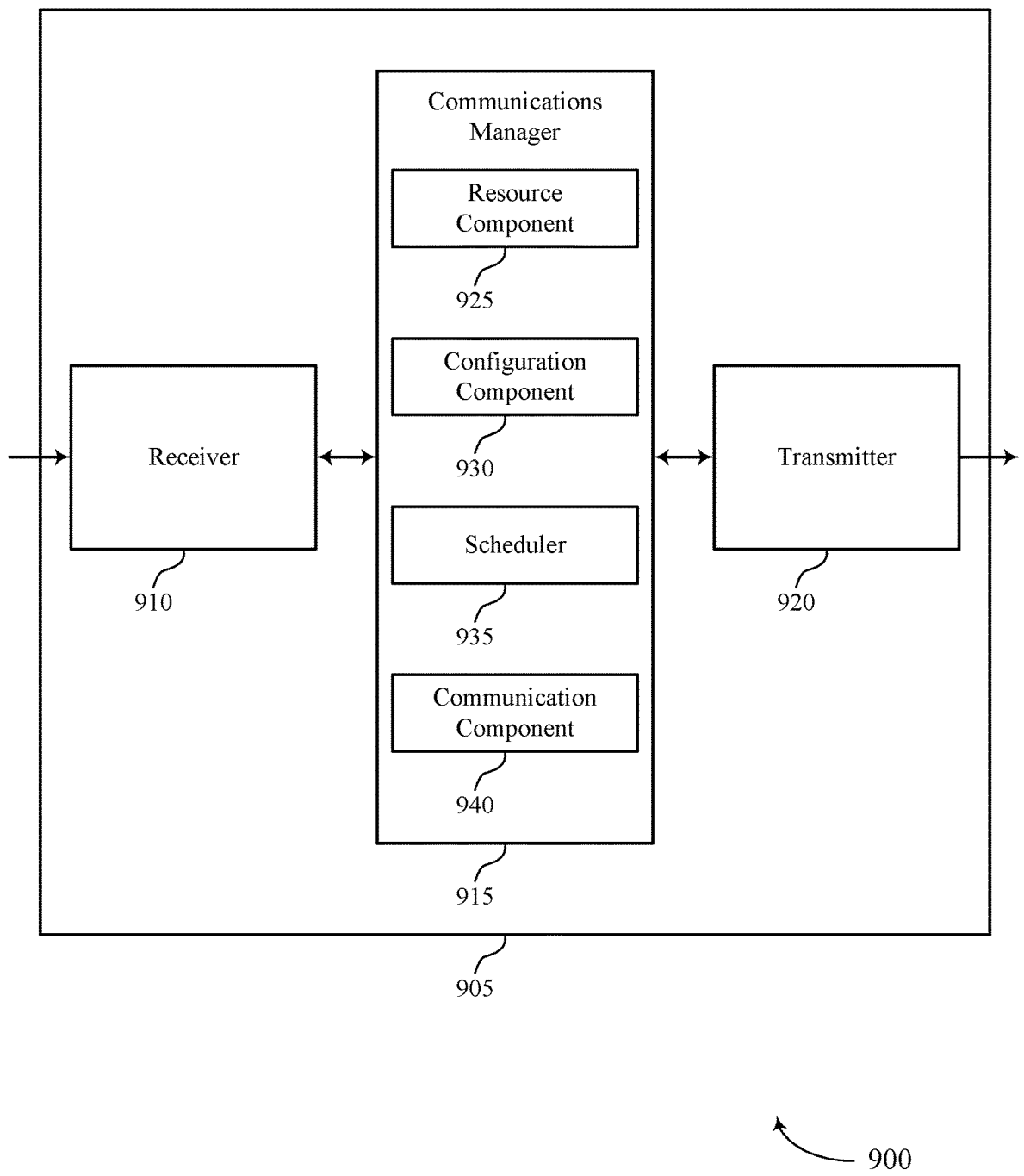

FIG. 9 shows a block diagram 900 of a wireless device 905 that supports resource coordination for half duplex communications in accordance with aspects of the present disclosure. Wireless device 905 may be an example of aspects of a wireless device 805 or a relay device (e.g., a UE 115, a base station 105, or an AN) as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to resource coordination for half duplex communications). Information may be passed on to other components of the device. The receiver 910 may be an example of aspects of the transceiver 1135 described with reference to FIG. 11 or the transceiver 1235 as described with reference to FIG. 12. The receiver 910 may utilize a single antenna or a set of antennas.

Communications manager 915 may be an example of aspects of the UE communications manager 1115 described with reference to FIG. 11 or the base station communications manager 1215 as described with reference to FIG. 12. Communications manager 915 may also include resource component 925, configuration component 930, scheduler 935, and communication component 940.

Resource component 925 may identify, at a relay device, a set of resources partitioned into a first subset of resources for the relay device and a second subset of resources for a parent network node and a child network node in communication with the relay device and receive a resource allocation scheme from the parent network node or an anchor network node, where the resource allocation scheme indicates the first and second subsets of resources.

Configuration component 930 may receive, from the parent network node, a first resource configuration for a slot of the second subset of resources and receive, from the child network node, a second resource configuration for the slot of the second subset of resources.

Scheduler 935 may schedule communications in the slot of the second subset of resources based on the first and second resource configurations and schedule communications for a slot of the first subset of resources independent of the first and second resource configurations.

Communication component 940 may communicate with one or more devices during the slot of the second subset of resources according to the scheduled communications, communicate with one or more devices during the slot of the second subset of resources based on the transmission regulation information, and communicate with one or more devices during the slot of the first subset of resources according to the scheduled communications.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11 or the transceiver 1235 as described with reference to FIG. 12. The transmitter 920 may utilize a single antenna or a set of antennas.

Figure 10:
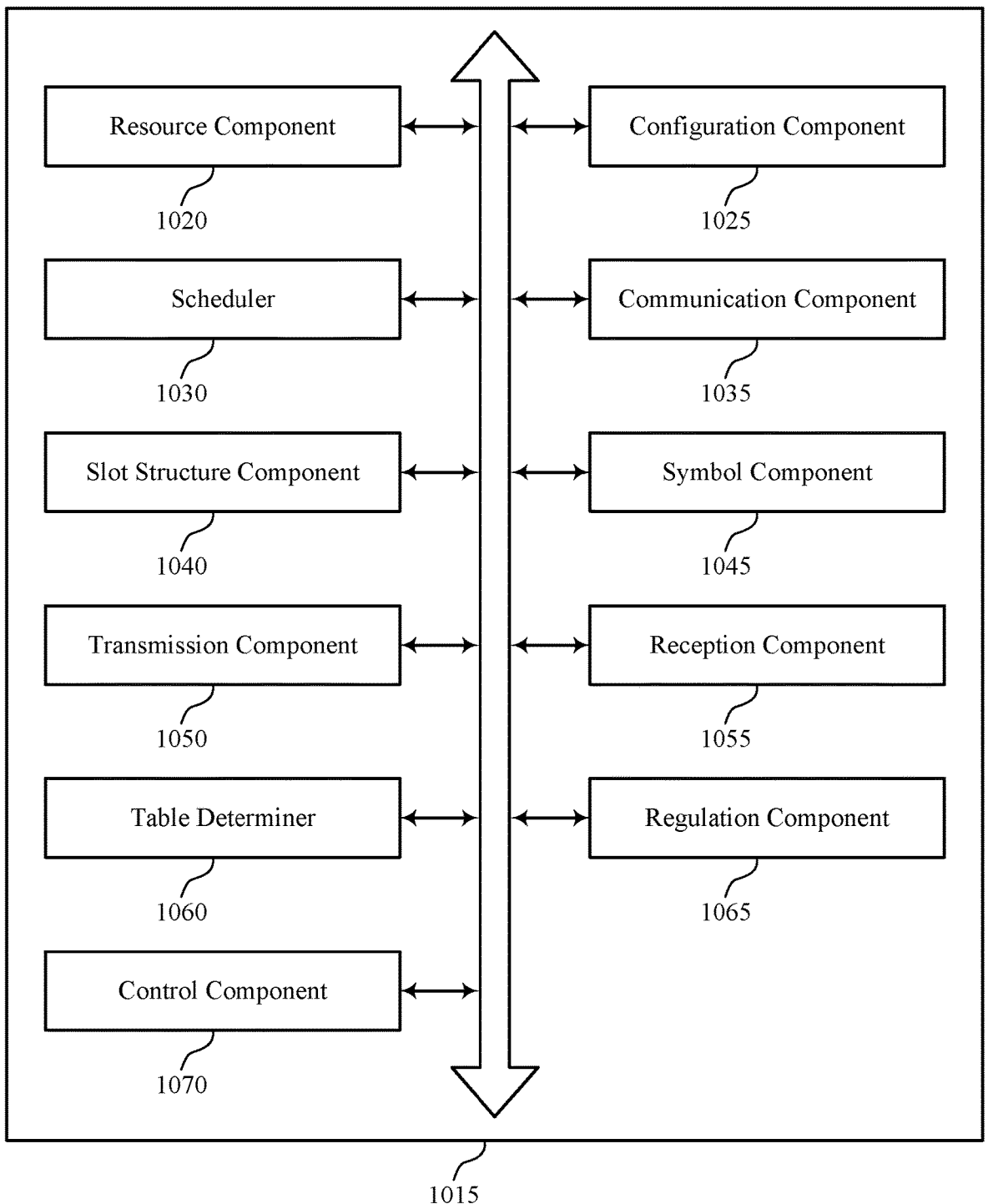

FIG. 10 shows a block diagram 1000 of a communications manager 1015 that supports resource coordination for half duplex communications in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include resource component 1020, configuration component 1025, scheduler 1030, communication component 1035, slot structure component 1040, symbol component 1045, transmission component 1050, reception component 1055, table determiner 1060, regulation component 1065, and control component 1070. Each of these modules may communicate, directly or indirectly, with one another (e.g., via one or more buses).

Resource component 1020 may identify, at a relay device, a set of resources partitioned into a first subset of resources for the relay device and a second subset of resources for a parent network node and a child network node in communication with the relay device and receive a resource allocation scheme from the parent network node or an anchor network node, where the resource allocation scheme indicates the first and second subsets of resources.

Configuration component 1025 may receive, from the parent network node, a first resource configuration for a slot of the second subset of resources and receive, from the child network node, a second resource configuration for the slot of the second subset of resources.

Scheduler 1030 may schedule communications in the slot of the second subset of resources based on the first and second resource configurations and schedule communications for a slot of the first subset of resources independent of the first and second resource configurations.

Communication component 1035 may communicate with one or more devices during the slot of the second subset of resources according to the scheduled communications, communicate with one or more devices during the slot of the second subset of resources based on the transmission regulation information, and communicate with one or more devices during the slot of the first subset of resources according to the scheduled communications.

Slot structure component 1040 may identify a slot structure for a slot of the first subset of resources, where the slot structure indicates a set of flexible symbols and identify, for the slot of the second subset of resources, a first set of free flexible symbols for the parent network node or the child network node.

Symbol component 1045 may divide the set of flexible symbols into a set of free flexible symbols and a set of non-free flexible symbols and determine the set of free flexible symbols based on a traffic demand of a cell supported by the relay device.

Transmission component 1050 may transmit an indication of the set of free flexible symbols to the parent network node or the child network node. Transmission component 1050 may transmit, to the child network node, a request for a number of free flexible symbols of the slot of the second subset of resources. Transmission component 1050 may transmit, to the parent network node, a request for a number of free flexible symbols of the slot of the second subset of resources and transmit. In some cases, transmitting the indication of the set of free flexible symbols includes transmitting an RRC message that specifies a ratio of a number of free flexible symbols to a total number of flexible symbols of the set of flexible symbols. In some examples, the indication includes a bitmap that specifies whether a flexible symbol of the set of flexible symbols is free.

Reception component 1055 may receive, from the parent network node or the child network node, a request for a number of free flexible symbols, where the indication of the set of free flexible symbols is transmitted in response to the request. Reception component 1055 may receive, from the parent network node, an indication of the number of free flexible symbols in response to the request transmitted by transmission component 1050. Reception component 1055 may receive, from the child network node, an indication of the number of free flexible symbols in response to the request transmitted by transmission component 1050. Reception component 1055 may receive the first resource configuration via a semi-static cell-specific message, a semi-static UE-specific message, or a group-common control channel. In some cases, the group-common control channel is received via a GC-PDCCH and includes an SFI. In some examples, receiving the indication of the number of free flexible symbols includes receiving a RRC message that specifies a ratio of the number of free flexible symbols to a total number of flexible symbols of the slot. In some instances, the indication includes a bitmap that specifies whether a flexible symbol of the slot of the second subset of resources is free. In some aspects, receiving the indication of the number of free flexible symbols includes receiving a RRC message that specifies a ratio of the number of free flexible symbols to a total number of flexible symbols of the slot. In some cases, the second resource configuration is received via a PUCCH or a PUSCH. In some examples, the semi-static cell-specific message is received via a SIB. In some instances, the semi-static UE-specific message is received via RRC signaling. In some aspects, the indication includes a bitmap that specifies whether a flexible symbol of the slot of the second subset of resources is free.

In some cases, transmission component 1050 may transmit, to the child network node, a request for the second resource configuration. Reception component 1055 may receive, from the child network node, the second resource configuration in response to the request transmitted by transmission component 1050.

Table determiner 1060 may determine a direction table for the slot of the second subset of resources based on the first and second resource configurations, where the direction table indicates a communication direction for a set of symbols of the slot of the second subset of resources and determine a direction table for the resources of the second subset of resources based on control channel configurations for the parent network node and the child network node. Table determiner 1060 may indicate the symbol of the slot of the second subset of resources as uplink based on determining that the parent network node and child network nodes are scheduled for downlink transmissions and determine, for a symbol of the slot of the second subset of resources, that the parent network node and the child network node are scheduled for uplink transmissions. Table determiner 1060 may indicate the symbol of the slot of the second subset of resources as downlink based on determining that the parent and child network nodes are scheduled for uplink transmissions and determine, for a symbol of the slot of the second subset of resources, that the parent network node and the child network node are scheduled for different communication directions.

Table determiner 1060 may determine, for a symbol of the slot of the second subset of resources, that the parent network node and the child network node are scheduled for downlink transmissions and determine, for a symbol of the slot of the second subset of resources, that the parent network node and the child network node are either free flexible or scheduled for downlink transmissions. Table determiner 1060 may indicate the symbol of the slot of the second subset of resources as uplink based on determining that the parent network node and the child network node are either free flexible or scheduled for downlink transmissions and determine, for a symbol of the slot of the second subset of resources, that the parent network node and the child network node are either free flexible or scheduled for uplink transmissions. Table determiner 1060 may indicate the symbol of the slot of the second subset of resources as downlink based on determining that the parent network node and the child network node are either free flexible or scheduled for downlink transmissions and indicate the symbol of the slot of the second subset of resources as unavailable based on determining that the parent and child network nodes are scheduled for different communication directions.

Regulation component 1065 may identify transmission regulation information associated with the second subset of resources. In some cases, identifying transmission regulation information includes receiving, from at least one of the parent network node and the child network node, transmission regulation information associated with the parent network node or the child network node. In some examples, the transmission regulation information includes a range of beam directions, a set of beam widths, or a transmission power.

Control component 1070 may allocate a control channel for the relay device to resources of the first subset of resources, allocate a second control channel for the relay device to resources of the second subset of resources, and receive an indication of a control channel allocation for a control channel for the relay device, where the control channel is associated with communications via the first or second subsets of resources. In some cases, the control channel is associated with communications via the first or second subsets of resources.

Figure 11:
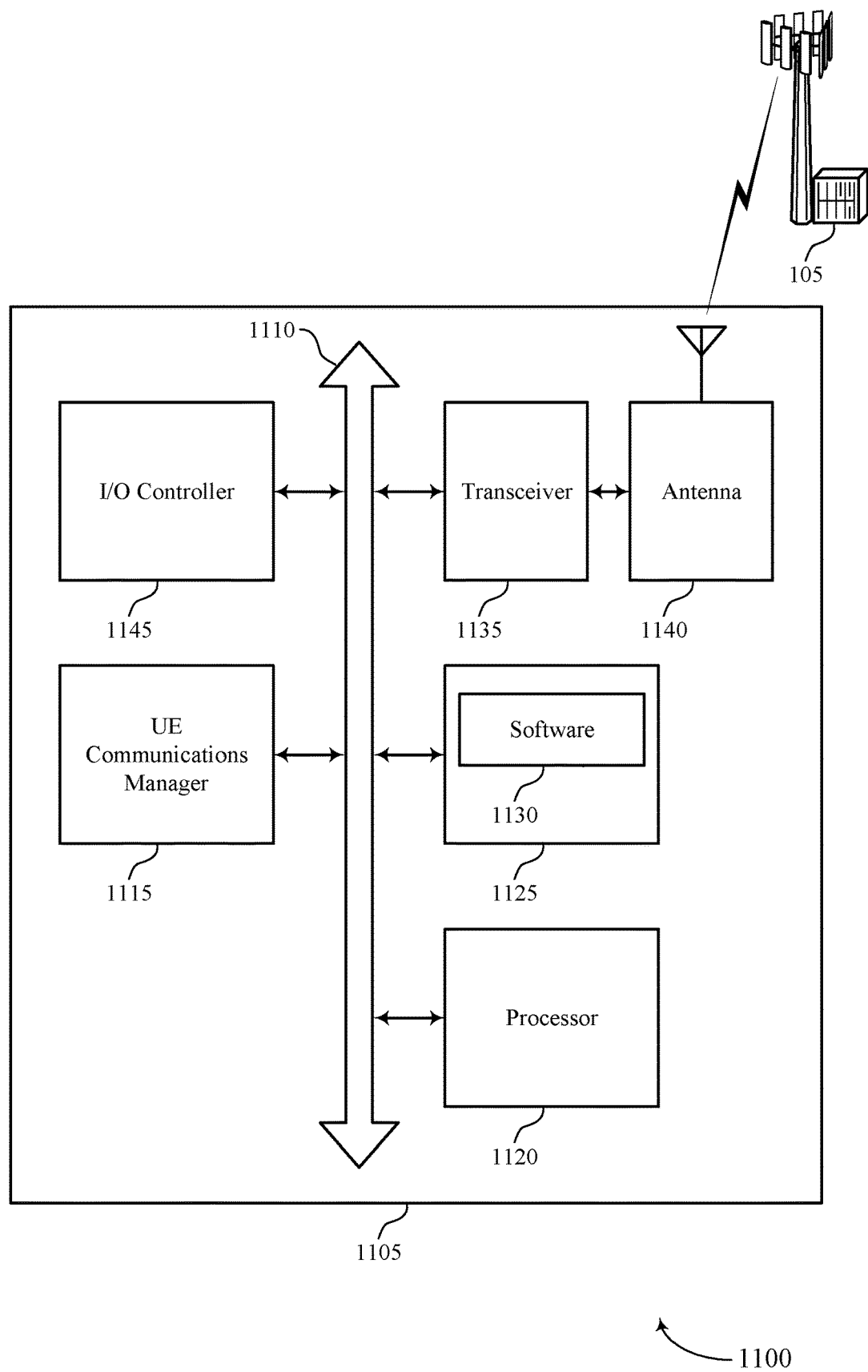
FIG. 11 illustrates a block diagram of a system including a user equipment (UE) that supports resource coordination for half duplex communications in accordance with aspects of the present disclosure.

FIG. 11 shows a diagram of a system 1100 including a device 1105 that supports resource coordination for half duplex communications in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting resource coordination for half duplex communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic I/O system (BIOS) which may control basic hardware or software operation such as the interaction with peripheral components or devices.

Software 1130 may include code to implement aspects of the present disclosure, including code to support resource coordination for half duplex communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the device 1105 may include a single antenna 1140, or the device 1105 may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
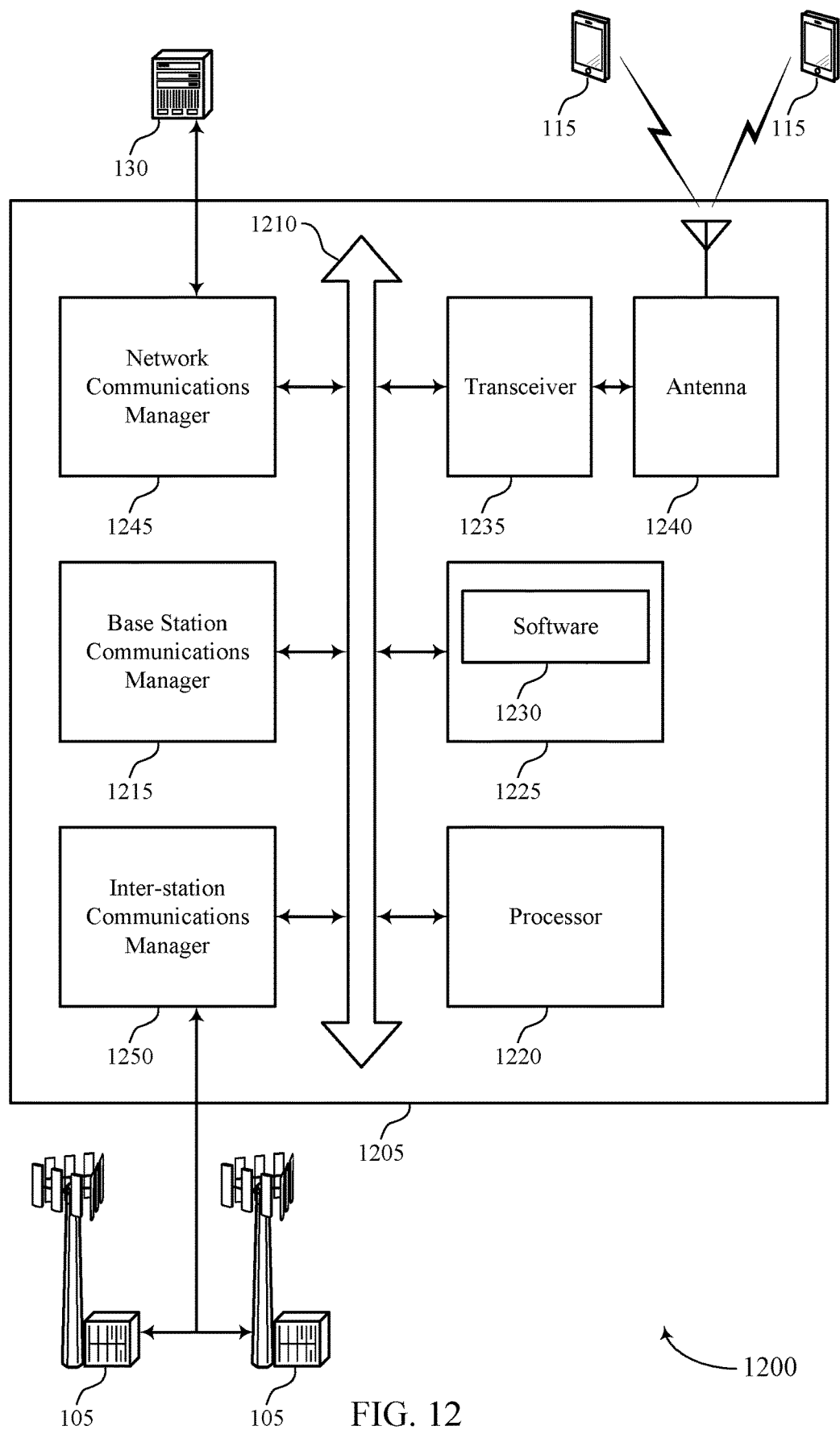
FIG. 12 illustrates a block diagram of a system including a base station that supports resource coordination for half duplex communications in accordance with aspects of the present disclosure.

FIG. 12 shows a diagram of a system 1200 including a device 1205 that supports resource coordination for half duplex communications in accordance with aspects of the present disclosure. Device 1205 may be an example of or include the components of wireless device 805, wireless device 905, a base station 105, or an AN 105 as described herein, e.g., with reference to FIGS. 8 and 9. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting resource coordination for half duplex communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support resource coordination for half duplex communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the device 1205 may include a single antenna 1240, or the device 1205 may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
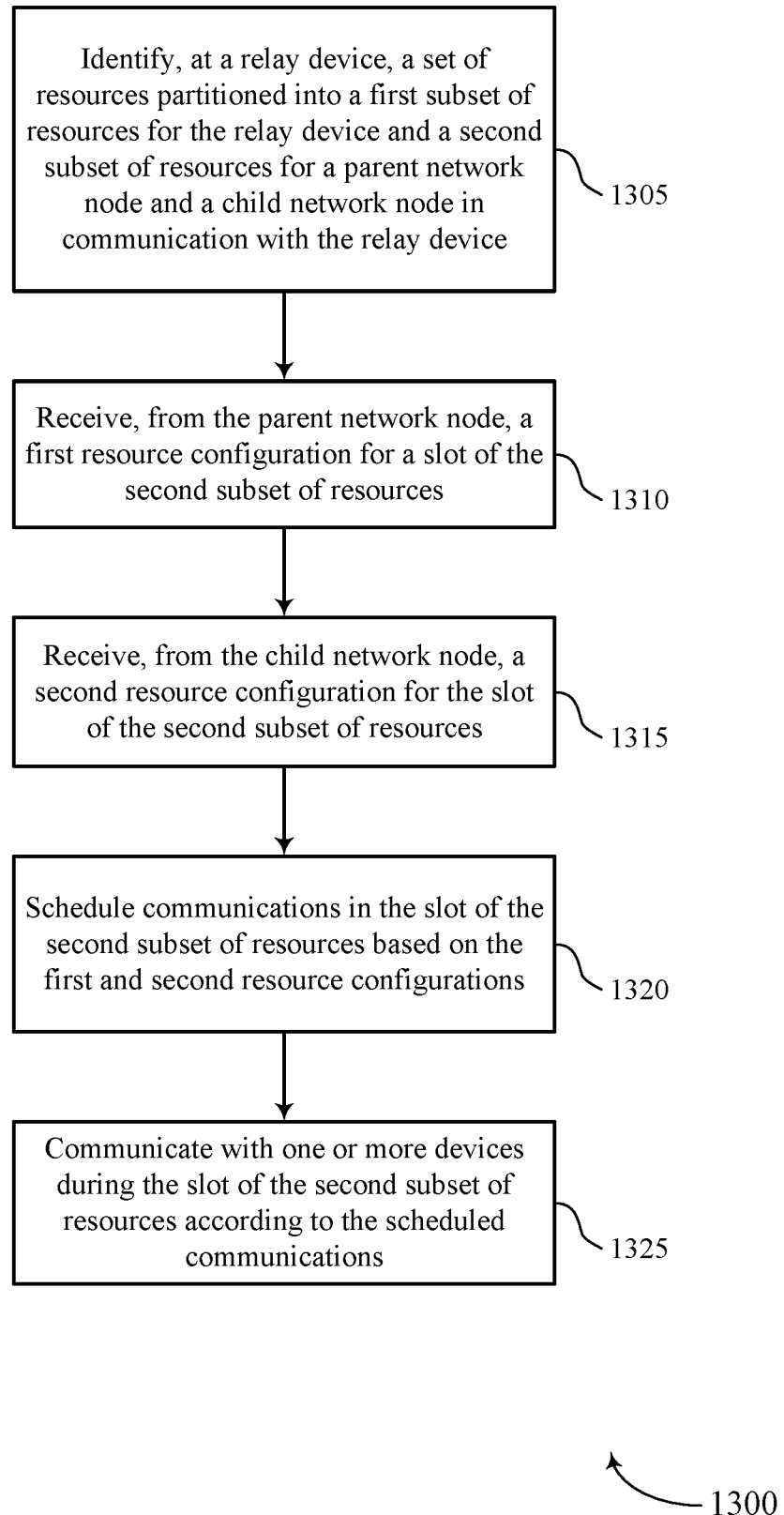
FIGS. 13 through 15 illustrate methods for resource coordination for half duplex communications in accordance with aspects of the present disclosure.

FIG. 13 shows a flowchart illustrating a method 1300 for resource coordination for half duplex communications in accordance with aspects of the present disclosure. The operations of method 1300 may be implemented by a relay device (e.g., a UE 115, a base station 105, or an AN) or its components as described herein. For example, the operations of method 1300 may be performed by a communications manager as described with reference to FIGS. 8 through 10. In some examples, a relay device may execute a set of codes to control the functional elements of the device to perform the functions described below. Additionally or alternatively, the UE 115 or base station 105 may perform aspects of the functions described below using special-purpose hardware.

At 1305 the relay device may identify, at a relay device, a set of resources partitioned into a first subset of resources for the relay device and a second subset of resources for a parent network node and a child network node in communication with the relay device. The operations of 1305 may be performed according to the methods described herein. In certain examples, aspects of the operations of 1305 may be performed by a resource component as described with reference to FIGS. 8 through 10.

At 1310 the relay device may receive, from the parent network node, a first resource configuration for a slot of the second subset of resources. The operations of 1310 may be performed according to the methods described herein. In certain examples, aspects of the operations of 1310 may be performed by a configuration component as described with reference to FIGS. 8 through 10.

At 1315 the relay device may receive, from the child network node, a second resource configuration for the slot of the second subset of resources. The operations of 1315 may be performed according to the methods described herein. In certain examples, aspects of the operations of 1315 may be performed by a configuration component as described with reference to FIGS. 8 through 10.

At 1320 the relay device may schedule communications in the slot of the second subset of resources based at least in part on the first and second resource configurations. The operations of 1320 may be performed according to the methods described herein. In certain examples, aspects of the operations of 1320 may be performed by a scheduler as described with reference to FIGS. 8 through 10.

At 1325 the relay device may communicate with one or more devices during the slot of the second subset of resources according to the scheduled communications. The operations of 1325 may be performed according to the methods described herein. In certain examples, aspects of the operations of 1325 may be performed by a communication component as described with reference to FIGS. 8 through 10.

Figure 14:
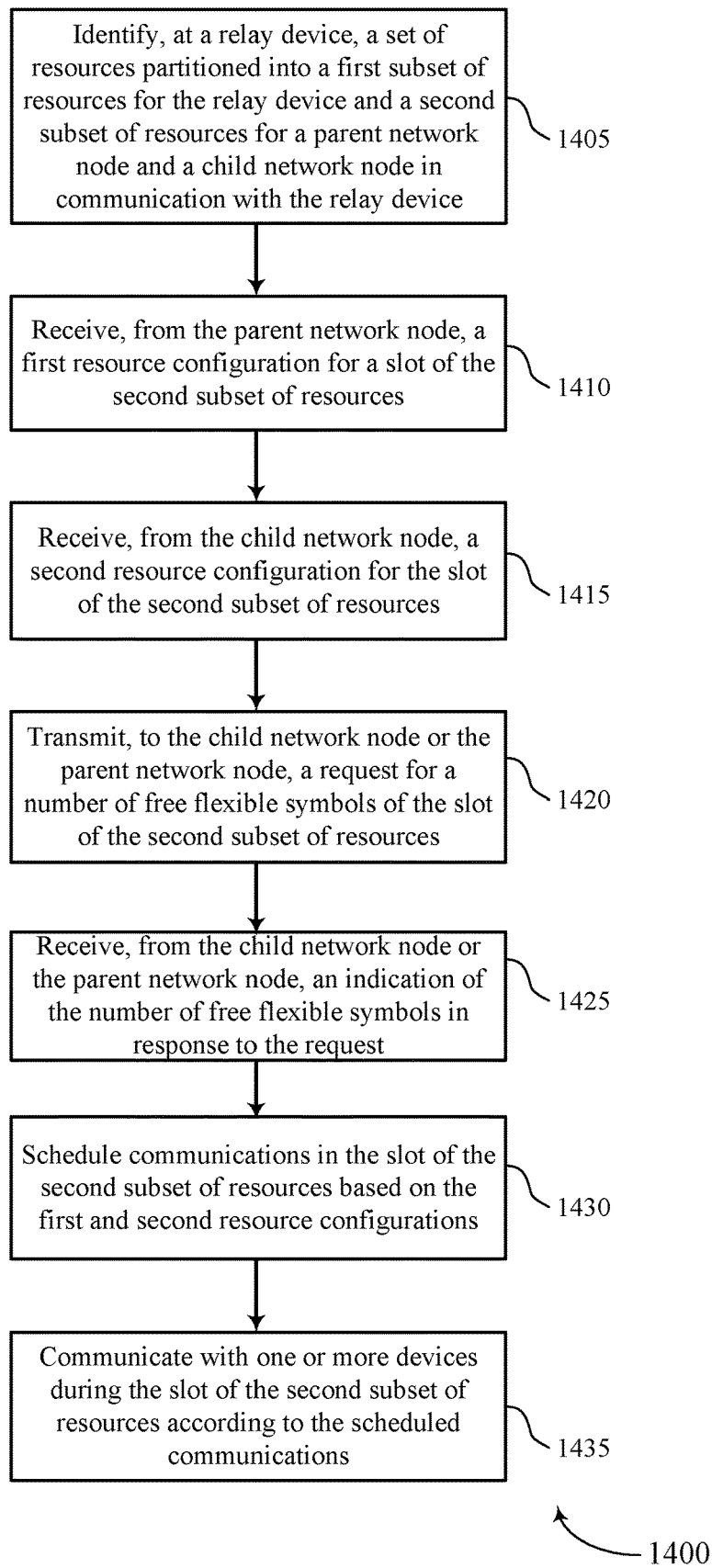

FIG. 14 shows a flowchart illustrating a method 1400 for resource coordination for half duplex communications in accordance with aspects of the present disclosure. The operations of method 1400 may be implemented by a relay device (e.g., a UE 115, a base station 105, or an AN) or its components as described herein. For example, the operations of method 1400 may be performed by a communications manager as described with reference to FIGS. 8 through 10. In some examples, a relay device may execute a set of codes to control the functional elements of the device to perform the functions described below. Additionally or alternatively, the relay device may perform aspects of the functions described below using special-purpose hardware.

At 1405 the relay device may identify, at a relay device, a set of resources partitioned into a first subset of resources for the relay device and a second subset of resources for a parent network node and a child network node in communication with the relay device. The operations of 1405 may be performed according to the methods described herein. In certain examples, aspects of the operations of 1405 may be performed by a resource component as described with reference to FIGS. 8 through 10.

At 1410 the relay device may receive, from the parent network node, a first resource configuration for a slot of the second subset of resources. The operations of 1410 may be performed according to the methods described herein. In certain examples, aspects of the operations of 1410 may be performed by a configuration component as described with reference to FIGS. 8 through 10.

At 1415 the relay device may receive, from the child network node, a second resource configuration for the slot of the second subset of resources. The operations of 1415 may be performed according to the methods described herein. In certain examples, aspects of the operations of 1415 may be performed by a configuration component as described with reference to FIGS. 8 through 10.

At 1420 the relay device may transmit, to the child network node or the parent network node, a request for a number of free flexible symbols of the slot of the second subset of resources. The operations of 1420 may be performed according to the methods described herein. In certain examples, aspects of the operations of 1420 may be performed by a transmission component as described with reference to FIGS. 8 through 10.

At 1425 the relay device may receive, from the child network node or the parent network node, an indication of the number of free flexible symbols in response to the request. The operations of 1425 may be performed according to the methods described herein. In certain examples, aspects of the operations of 1425 may be performed by a reception component as described with reference to FIGS. 8 through 10.

At 1430 the relay device may schedule communications in the slot of the second subset of resources based at least in part on the first and second resource configurations. The operations of 1430 may be performed according to the methods described herein. In certain examples, aspects of the operations of 1430 may be performed by a scheduler as described with reference to FIGS. 8 through 10.

At 1435 the relay device may communicate with one or more devices during the slot of the second subset of resources according to the scheduled communications. The operations of 1435 may be performed according to the methods described herein. In certain examples, aspects of the operations of 1435 may be performed by a communication component as described with reference to FIGS. 8 through 10.

Figure 15:
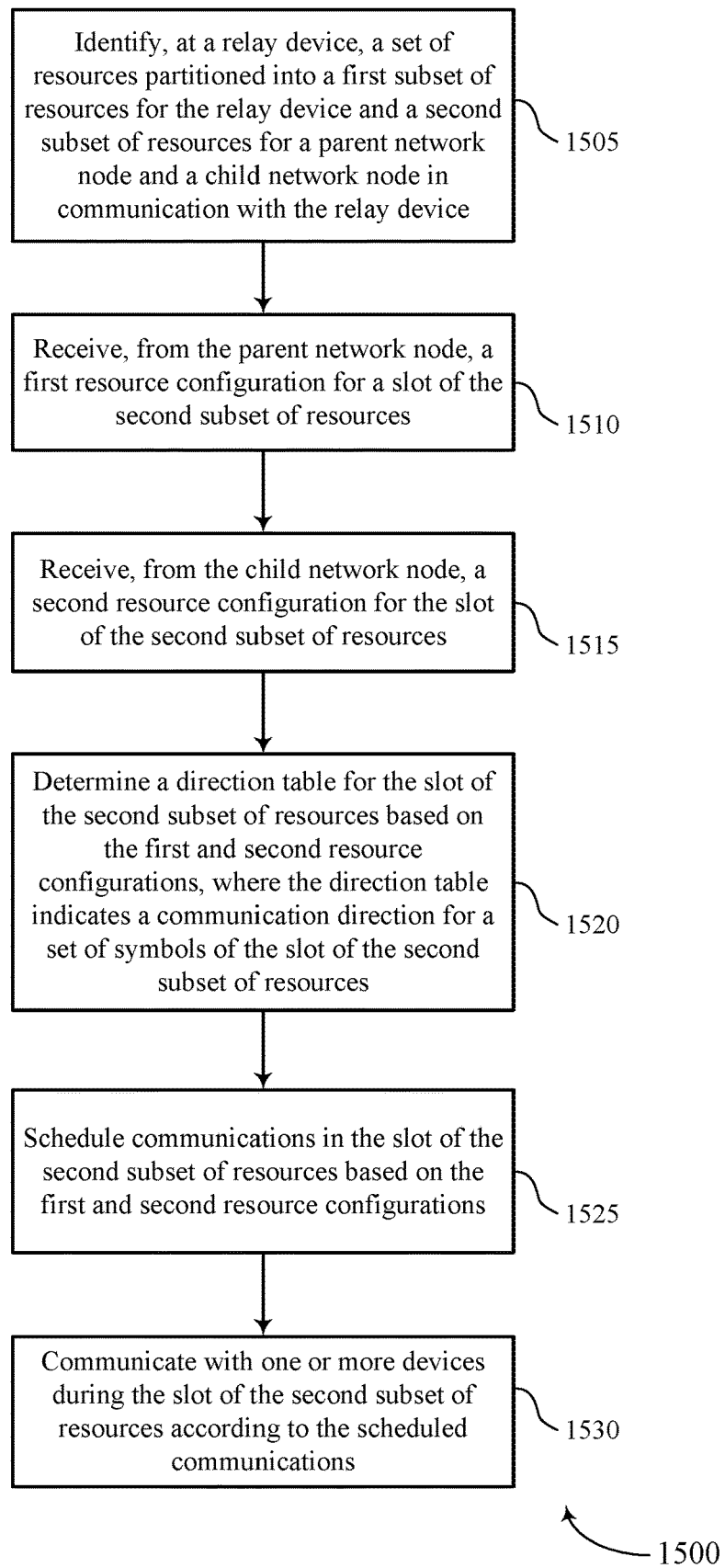

FIG. 15 shows a flowchart illustrating a method 1500 for resource coordination for half duplex communications in accordance with aspects of the present disclosure. The operations of method 1500 may be implemented by a relay device (e.g., a UE 115, a base station 105, or an AN) or its components as described herein. For example, the operations of method 1500 may be performed by a communications manager as described with reference to FIGS. 8 through 10. In some examples, a relay device may execute a set of codes to control the functional elements of the device to perform the functions described below. Additionally or alternatively, the relay device may perform aspects of the functions described below using special-purpose hardware.

At 1505 the relay device may identify, at a relay device, a set of resources partitioned into a first subset of resources for the relay device and a second subset of resources for a parent network node and a child network node in communication with the relay device. The operations of 1505 may be performed according to the methods described herein. In certain examples, aspects of the operations of 1505 may be performed by a resource component as described with reference to FIGS. 8 through 10.

At 1510 the relay device may receive, from the parent network node, a first resource configuration for a slot of the second subset of resources. The operations of 1510 may be performed according to the methods described herein. In certain examples, aspects of the operations of 1510 may be performed by a configuration component as described with reference to FIGS. 8 through 10.

At 1515 the relay device may receive, from the child network node, a second resource configuration for the slot of the second subset of resources. The operations of 1515 may be performed according to the methods described herein. In certain examples, aspects of the operations of 1515 may be performed by a configuration component as described with reference to FIGS. 8 through 10.

At 1520 the relay device may determine a direction table for the slot of the second subset of resources based at least in part on the first and second resource configurations, where the direction table indicates a communication direction for a set of symbols of the slot of the second subset of resources. The operations of 1520 may be performed according to the methods described herein. In certain examples, aspects of the operations of 1520 may be performed by a table determiner as described with reference to FIGS. 8 through 10.

At 1525 the relay device may schedule communications in the slot of the second subset of resources based at least in part on the first and second resource configurations. The operations of 1525 may be performed according to the methods described herein. In certain examples, aspects of the operations of 1525 may be performed by a scheduler as described with reference to FIGS. 8 through 10.

At 1530 the relay device may communicate with one or more devices during the slot of the second subset of resources according to the scheduled communications. The operations of 1530 may be performed according to the methods described herein. In certain examples, aspects of the operations of 1530 may be performed by a communication component as described with reference to FIGS. 8 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples.

A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
identifying, at a relay device, a set of resources partitioned into a first subset of resources for the relay device and a second subset of resources for a parent network node and a child network node in communication with the relay device, wherein the relay device is in a first node set and the parent network node and child network node are in a second node set different from the first node set;
receiving, from the parent network node, a resource configuration for a slot of the second subset of resources;
scheduling communications in the slot of the second subset of resources based at least in part on the resource configuration; and
communicating with one or more devices during the slot of the second subset of resources according to the scheduled communications.

2. The method of claim 1, further comprising:
identifying a slot structure for a slot of the first subset of resources, wherein the slot structure indicates a set of flexible symbols;
dividing the set of flexible symbols into a set of free flexible symbols and a set of non-free flexible symbols; and
transmitting an indication of the set of free flexible symbols to the parent network node or the child network node.

3. The method of claim 2, further comprising:
receiving, from the parent network node or the child network node, a request for a number of free flexible symbols, wherein the indication of the set of free flexible symbols is transmitted in response to the request.

4. The method of claim 2, wherein transmitting the indication of the set of free flexible symbols comprises:
transmitting a radio resource control (RRC) message that specifies a ratio of a number of free flexible symbols to a total number of flexible symbols of the set of flexible symbols.

5. The method of claim 2, further comprising:
determining the set of free flexible symbols based at least in part on a traffic demand of a cell supported by the relay device.

6. The method of claim 2, wherein the indication comprises a bitmap that specifies whether a flexible symbol of the set of flexible symbols is free.

7. The method of claim 1, further comprising:
transmitting, to the child network node, a request for a number of free flexible symbols of the slot of the second subset of resources; and
receiving, from the child network node, an indication of the number of free flexible symbols in response to the request.

8. The method of claim 7, wherein receiving the indication of the number of free flexible symbols comprises:
receiving a radio resource control (RRC) message that specifies a ratio of the number of free flexible symbols to a total number of flexible symbols of the slot.

9. The method of claim 7, wherein the indication comprises a bitmap that specifies whether a flexible symbol of the slot of the second subset of resources is free.

10. The method of claim 1, further comprising:
transmitting, to the parent network node, a request for a number of free flexible symbols of the slot of the second subset of resources; and
receiving, from the parent network node, an indication of the number of free flexible symbols in response to the request.

11. The method of claim 10, wherein receiving the indication of the number of free flexible symbols comprises:
receiving a radio resource control (RRC) message that specifies a ratio of the number of free flexible symbols to a total number of flexible symbols of the slot.

12. The method of claim 10, wherein the indication comprises a bitmap that specifies whether a flexible symbol of the slot of the second subset of resources is free.

13. The method of claim 1, further comprising:
determining a direction table for the slot of the second subset of resources based at least in part on the first and second resource configurations, wherein the direction table indicates a communication direction for a set of symbols of the slot of the second subset of resources.

14. The method of claim 13, further comprising:
determining, for a symbol of the slot of the second subset of resources, that the parent network node and the child network node are scheduled for downlink transmissions; and
indicating the symbol of the slot of the second subset of resources as uplink based at least in part on determining that the parent network node and child network nodes are scheduled for downlink transmissions.

15. The method of claim 13, further comprising:
determining, for a symbol of the slot of the second subset of resources, that the parent network node and the child network node are scheduled for uplink transmissions; and
indicating the symbol of the slot of the second subset of resources as downlink based at least in part on determining that the parent and child network nodes are scheduled for uplink transmissions.

16. The method of claim 13, further comprising:
determining, for a symbol of the slot of the second subset of resources, that the parent network node and the child network node are scheduled for different communication directions; and
indicating the symbol of the slot of the second subset of resources as unavailable based at least in part on determining that the parent and child network nodes are scheduled for different communication directions.

17. The method of claim 13, further comprising:
identifying, for the slot of the second subset of resources, a first set of free flexible symbols for the parent network node or the child network node;
determining, for a symbol of the slot of the second subset of resources, that the parent network node and the child network node are either free flexible or scheduled for downlink transmissions; and
indicating the symbol of the slot of the second subset of resources as uplink based at least in part on determining that the parent network node and the child network node are either free flexible or scheduled for downlink transmissions.

18. The method of claim 13, further comprising:
identifying, for the slot of the second subset of resources, a first set of free flexible symbols for the parent network node or the child network node;
determining, for a symbol of the slot of the second subset of resources, that the parent network node and the child network node are either free flexible or scheduled for uplink transmissions; and
indicating the symbol of the slot of the second subset of resources as downlink based at least in part on determining that the parent network node and the child network node are either free flexible or scheduled for uplink transmissions.

19. The method of claim 1, further comprising:
receiving a resource allocation scheme from the parent network node or an anchor network node, wherein the resource allocation scheme indicates the first and second subsets of resources.

20. The method of claim 1, further comprising:
transmitting, to the child network node, a request for the second resource configuration; and
receiving, from the child network node, the second resource configuration in response to the request.

21. The method of claim 20, wherein the second resource configuration is received via a physical uplink control channel (PUCCH) or a physical uplink shared channel (PUSCH).

22. The method of claim 1, further comprising:
identifying transmission regulation information associated with the second sub set of resources; and
communicating with the one or more devices during the slot of the second subset of resources based at least in part on the transmission regulation information.

23. The method of claim 22, wherein identifying the transmission regulation information comprises:
receiving, from at least one of the parent network node and the child network node, transmission regulation information associated with the parent network node or the child network node.

24. The method of claim 23, wherein the transmission regulation information comprises a range of beam directions, a set of beam widths, or a transmission power.

25. The method of claim 1, further comprising:
allocating a control channel for the relay device to resources of the first subset of resources.

26. The method of claim 25, wherein the control channel is associated with communications via the first or second subsets of resources.

27. The method of claim 25, further comprising:
allocating a second control channel for the relay device to resources of the second subset of resources.

28. The method of claim 27, further comprising:
determining a direction table for the resources of the second subset of resources based at least in part on control channel configurations for the parent network node and the child network node.

29. The method of claim 1, further comprising:
receiving an indication of a control channel allocation assigning a control channel to the relay device, wherein the control channel is associated with communications via the first or second subsets of resources.

30. The method of claim 1, further comprising:
scheduling communications for a slot of the first subset of resources independent of the first and second resource configurations; and
communicating with the one or more devices during the slot of the first subset of resources according to the scheduled communications.

31. The method of claim 1, further comprising:
receiving the first resource configuration via a semi-static cell-specific message, a semi-static user equipment (UE)-specific message, or a group-common control channel.

32. The method of claim 31, wherein:
the semi-static cell-specific message is received via a system information block (SIB);
the semi-static UE-specific message is received via radio resource control (RRC) signaling; and the group-common control channel is received via a group-common physical downlink control channel (GC-PDCCH) and comprises a slot format indicator (SFI).

33. An apparatus for wireless communications, comprising:
means for identifying, at a relay device, a set of resources partitioned into a first subset of resources for the relay device and a second subset of resources for a parent network node and a child network node in communication with the relay device, wherein the relay device is in a first node set and the parent network node and child network node are in a second node set different from the first node set;
means for receiving, from the parent network node, a resource configuration for a slot of the second subset of resources;
means for scheduling communications in the slot of the second subset of resources based at least in part on the resource configuration; and
means for communicating with one or more devices during the slot of the second subset of resources according to the scheduled communications.

34. An apparatus for wireless communications, comprising:
a processor;
memory coupled with the processor; and
instructions stored in the memory and executable by the processor to cause the apparatus to:
identify, at a relay device, a set of resources partitioned into a first subset of resources for the relay device and a second subset of resources for a parent network node and a child network node in communication with the relay device, wherein the relay device is in a first node set and the parent network node and child network node are in a second node set different from the first node set;
receive, from the parent network node, a resource configuration for a slot of the second subset of resources;
schedule communications in the slot of the second subset of resources based at least in part on the resource configuration; and
communicate with one or more devices during the slot of the second subset of resources according to the scheduled communications.

35. The apparatus of claim 34, wherein the instructions are further executable by the processor to cause the apparatus to:
identify a slot structure for a slot of the first subset of resources, wherein the slot structure indicates a set of flexible symbols;
divide the set of flexible symbols into a set of free flexible symbols and a set of non-free flexible symbols; and
transmit an indication of the set of free flexible symbols to the parent network node or the child network node.

36. The apparatus of claim 35, wherein the instructions are further executable by the processor to cause the apparatus to:
receive, from the parent network node or the child network node, a request for a number of free flexible symbols, wherein the indication of the set of free flexible symbols is transmitted in response to the request.

37. The apparatus of claim 35, wherein the instructions to transmit the indication of the set of free flexible symbols are executable by the processor to cause the apparatus to:

transmit a radio resource control (RRC) message that specifies a ratio of a number of free flexible symbols to a total number of flexible symbols of the set of flexible symbols.

38. The apparatus of claim 35, wherein the instructions are further executable by the processor to cause the apparatus to:
determine the set of free flexible symbols based at least in part on a traffic demand of a cell supported by the relay device.

39. The apparatus of claim 35, wherein the indication comprises a bitmap that specifies whether a flexible symbol of the set of flexible symbols is free.

40. The apparatus of claim 34, wherein the instructions are further executable by the processor to cause the apparatus to:
transmit, to the child network node, a request for a number of free flexible symbols of the slot of the second subset of resources; and
receive, from the child network node, an indication of the number of free flexible symbols in response to the request.

41. The apparatus of claim 40, wherein the instructions to receive the indication of the number of free flexible symbols are executable by the processor to cause the apparatus to:
receive a radio resource control (RRC) message that specifies a ratio of the number of free flexible symbols to a total number of flexible symbols of the slot.

42. The apparatus of claim 40, wherein the indication comprises a bitmap that specifies whether a flexible symbol of the slot of the second subset of resources is free.

43. The apparatus of claim 34, wherein the instructions are further executable by the processor to cause the apparatus to:
transmit, to the parent network node, a request for a number of free flexible symbols of the slot of the second subset of resources; and
receive, from the parent network node, an indication of the number of free flexible symbols in response to the request.

44. The apparatus of claim 43, wherein the instructions to receive the indication of the number of free flexible symbols are executable by the processor to cause the apparatus to:
receive a radio resource control (RRC) message that specifies a ratio of the number of free flexible symbols to a total number of flexible symbols of the slot.

45. The apparatus of claim 43, wherein the indication comprises a bitmap that specifies whether a flexible symbol of the slot of the second subset of resources is free.

46. The apparatus of claim 34, wherein the instructions are further executable by the processor to cause the apparatus to:
determine a direction table for the slot of the second subset of resources based at least in part on the first and second resource configurations, wherein the direction table indicates a communication direction for a set of symbols of the slot of the second subset of resources.

47. The apparatus of claim 46, wherein the instructions are further executable by the processor to cause the apparatus to:
determine, for a symbol of the slot of the second subset of resources, that the parent network node and the child network node are scheduled for downlink transmissions; and
indicate the symbol of the slot of the second subset of resources as uplink based at least in part on determining that the parent network node and child network nodes are scheduled for downlink transmissions.

48. The apparatus of claim 46, wherein the instructions are further executable by the processor to cause the apparatus to:
determine, for a symbol of the slot of the second subset of resources, that the parent network node and the child network node are scheduled for uplink transmissions; and
indicate the symbol of the slot of the second subset of resources as downlink based at least in part on determining that the parent and child network nodes are scheduled for uplink transmissions.

49. The apparatus of claim 46, wherein the instructions are further executable by the processor to cause the apparatus to:
determine, for a symbol of the slot of the second subset of resources, that the parent network node and the child network node are scheduled for different communication directions; and
indicate the symbol of the slot of the second subset of resources as unavailable based at least in part on determining that the parent and child network nodes are scheduled for different communication directions.

50. The apparatus of claim 46, wherein the instructions are further executable by the processor to cause the apparatus to:
identify, for the slot of the second subset of resources, a first set of free flexible symbols for the parent network node or the child network node;
determine, for a symbol of the slot of the second subset of resources, that the parent network node and the child network node are either free flexible or scheduled for downlink transmissions; and
indicate the symbol of the slot of the second subset of resources as uplink based at least in part on determining that the parent network node and the child network node are either free flexible or scheduled for downlink transmissions.

51. The apparatus of claim 46, wherein the instructions are further executable by the processor to cause the apparatus to:
identify, for the slot of the second subset of resources, a first set of free flexible symbols for the parent network node or the child network node;
determine, for a symbol of the slot of the second subset of resources, that the parent network node and the child network node are either free flexible or scheduled for uplink transmissions; and
indicate the symbol of the slot of the second subset of resources as downlink based at least in part on determining that the parent network node and the child network node are either free flexible or scheduled for uplink transmissions.

52. The apparatus of claim 34, wherein the instructions are further executable by the processor to cause the apparatus to:
receive a resource allocation scheme from the parent network node or an anchor network node, wherein the resource allocation scheme indicates the first and second subsets of resources.

53. The apparatus of claim 34, wherein the instructions are further executable by the processor to cause the apparatus to:
transmit, to the child network node, a request for the second resource configuration; and receive, from the child network node, the second resource configuration in response to the request.

54. The apparatus of claim 53, wherein the second resource configuration is received via a physical uplink control channel (PUCCH) or a physical uplink shared channel (PUSCH).

55. The apparatus of claim 34, wherein the instructions are further executable by the processor to cause the apparatus to:
identify transmission regulation information associated with the second subset of resources; and
communicate with the one or more devices during the slot of the second subset of resources based at least in part on the transmission regulation information.

56. The apparatus of claim 55, wherein the instructions to identify transmission regulation information are executable by the processor to cause the apparatus to:
receive, from at least one of the parent network node and the child network node, transmission regulation information associated with the parent network node or the child network node.

57. The apparatus of claim 56, wherein the transmission regulation information comprises a range of beam directions, a set of beam widths, or a transmission power.

58. The apparatus of claim 34, wherein the instructions are further executable by the processor to cause the apparatus to:
allocate a control channel for the relay device to resources of the first subset of resources.

59. The apparatus of claim 58, wherein the control channel is associated with the communications via the first or second subsets of resources.

60. The apparatus of claim 58, wherein the instructions are further executable by the processor to cause the apparatus to:
allocate a second control channel for the relay device to resources of the second subset of resources.

61. The apparatus of claim 60, wherein the instructions are further executable by the processor to cause the apparatus to:
determine a direction table for the resources of the second subset of resources based at least in part on control channel configurations for the parent network node and the child network node.

62. The apparatus of claim 34, wherein the instructions are further executable by the processor to cause the apparatus to:
receive an indication of a control channel allocation assigning a control channel to the relay device, wherein the control channel is associated with the communications via the first or second subsets of resources.

63. The apparatus of claim 34, wherein the instructions are further executable by the processor to cause the apparatus to:
schedule communications for a slot of the first subset of resources independent of the first and second resource configurations; and
communicate with the one or more devices during the slot of the first subset of resources according to the scheduled communications.

64. The apparatus of claim 34, wherein the instructions are further executable by the processor to cause the apparatus to:
receive the first resource configuration via a semi-static cell-specific message, a semi-static user equipment (UE)-specific message, or a group-common control channel.

65. The apparatus of claim 64, wherein:
the semi-static cell-specific message is received via a system information block (SIB);
the semi-static UE-specific message is received via radio resource control (RRC) signaling; and
the group-common control channel is received via a group-common physical downlink control channel (GC-PDCCH) and comprises a slot format indicator (SFI).

66. A non-transitory computer-readable medium storing code for wireless communications, the code comprising instructions executable by a processor to:
identify, at a relay device, a set of resources partitioned into a first subset of resources for the relay device and a second subset of resources for a parent network node and a child network node in communication with the relay device, wherein the relay device is in a first node set and the parent network node and child network node are in a second node set different from the first node set;
receive, from the parent network node, a resource configuration for a slot of the second subset of resources;
schedule communications in the slot of the second subset of resources based at least in part on the resource configuration; and
communicate with one or more devices during the slot of the second subset of resources according to the scheduled communications.

* * * * *